United States Patent
Dunn et al.

(10) Patent No.: US 9,507,760 B2
(45) Date of Patent: Nov. 29, 2016

(54) METHODS AND APPARATUS FOR ELECTRONIC DOCUMENT HANDLING

(71) Applicant: Citrix Systems, Inc., Fort Lauderdale, FL (US)

(72) Inventors: Cary Dunn, Santa Barbara, CA (US); Daryl Bernstein, Santa Barbara, CA (US); Damian Rebman, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 131 days.

(21) Appl. No.: 14/134,263

(22) Filed: Dec. 19, 2013

(65) Prior Publication Data

US 2015/0178252 A1 Jun. 25, 2015

(51) Int. Cl.
  *G06F 17/00* (2006.01)
  *G06F 17/22* (2006.01)
  *G06F 17/24* (2006.01)
  *G06Q 10/10* (2012.01)

(52) U.S. Cl.
  CPC ....... *G06F 17/2247* (2013.01); *G06F 17/2264* (2013.01); *G06F 17/243* (2013.01); *G06Q 10/103* (2013.01)

(58) Field of Classification Search
  CPC .. G06F 17/2247; G06F 17/24; G06F 17/211; G06F 17/243; G06Q 10/103
  See application file for complete search history.

(56) References Cited

U.S. PATENT DOCUMENTS

| | | | | |
|---|---|---|---|---|
| 2003/0036912 | A1* | 2/2003 | Sobotta | G06F 17/243 705/31 |
| 2005/0060280 | A1* | 3/2005 | Wolfston | G06F 17/30873 |
| 2007/0298773 | A1* | 12/2007 | Uematsu | G06F 17/30905 455/414.2 |
| 2008/0172239 | A1* | 7/2008 | Henderson | G06F 17/243 705/311 |
| 2009/0027421 | A1* | 1/2009 | Servan-Schreiber | G06F 3/0481 345/661 |
| 2010/0090964 | A1* | 4/2010 | Soo | G06F 3/0416 345/173 |
| 2011/0035702 | A1* | 2/2011 | Williams | G06F 3/0481 715/800 |
| 2011/0093769 | A1 | 4/2011 | Dunn et al. | |
| 2013/0205189 | A1* | 8/2013 | DiPierro | G06F 17/243 715/224 |

OTHER PUBLICATIONS

International Search Report and Written Opinion of the International Searching Authority, International Application No. PCT/US2014/071059, International Filing Date Dec. 18, 2014, Applicant Citrix Systems, Inc., 10 pages.

* cited by examiner

*Primary Examiner* — Stephen Hong
*Assistant Examiner* — Shahid Khan
(74) *Attorney, Agent, or Firm* — BainwoodHuang

(57) ABSTRACT

A method for electronic document handling utilizing a browser apparatus communicatively coupled to a document execution server comprises downloading an unsigned electronic document from the document execution server to the browser apparatus and downloading a front-end program including zoom instructions from the document execution server to the browser apparatus. The front-end program may be separate from or part of the unsigned electronic document. The method also includes displaying the unsigned electronic document on the display screen of the browser apparatus. This displaying includes displaying fields to be filled in by the operator of the browser apparatus using the pointing apparatus and the data entry apparatus. The method also includes running the front-end program downloaded from the document execution server to zoom into or out of at least one of the displayed fields.

18 Claims, 31 Drawing Sheets

| SIGN DOCUMENT | YOUR PROGRESS: 0% |

YOU HAVE 1 ITEM TO FILL-IN ON PAGE 1

MUTUAL
NON-DISCLOSURE AGREEMENT

THIS AGREEMENT MADE THIS _____ DAY OF _____,
2008 ("EFFECTIVE DATE") BY AND BETWEEN _____,
A _____ CORPORATION, HAVING A PRINCIPAL PLACE OF
BUSINESS AT _____ (HEREINAFTER "PARTY ONE"),
130 — AND _____ (HAVING A PRINCIPAL PLACE OF BUSINESS
126 — [REQUIRED]
(HEREINAFTER "DISCLOSE")

WHEREAS, BOTH PARTIES INTEND TO DISCLOSE TO EACH
OTHER PROPRIETARY/COMPANY-CONFIDENTIAL
INFORMATION FOR THE PURPOSE OF DISCUSSING MUTUAL
BUSINESS DEVELOPMENT OPPORTUNITIES AND
POTENTIAL TEAMING AGREEMENTS WHICH MAY RESULT IN
A TEAMING AGREEMENT FOR PARTY ONE AND IT'S
TECHNOLOGY, PRODUCTS AND SERVICES.

112 —

X _____

SUBMIT
SIGNATURE

GUID:
XYRUIEDJDOLGHSDHFK
SUBJECT: PLEASE SIGN
THIS NDA MESSAGE:
PLEASE SIGN THIS
DOCUMENT

CC DARYL BERN
   daryl@bern.com
   JULIE SANTOS
   julie@santos.com
   MARTIN SANTOS
   martin@santos.com

SENT       EXPIRES
10/10/2010  10/11/2010

FIG 2A

FLAG USER-1 [ user-l 1        ] xxxxxxxxxxxxx [ user-2         ] xxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxx xxxxxxxxxxxxxx x xxxxxxxxxxxxxxxxxxxxxx
xxxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxxx
FLAG USER-1          xxxxx [ user-1] xxxxxxxxxxxxxxxxxxxxxxxxxxxxxxxx xxx
xxxxxxxxxxxxxxxxxxxxxxxxxxxxxxxxxxxxxxx[ user-2     ]xxxxxxxxxxxxxxxxxx
xxxxxxxxxxxxxxxxxxxxxxxxxxxxxxxxxxxxxxxxxxxxxxxxxxxxxxxxxxxxxxxxx
FLAG USER-1         [ user-1   ]                [ user-2   ]
                     Xxxxxxxxxxxxx                xxxxxxxxxxxxxxxxx

FIG 7A

FLAG USER-2 [ user-l 2          ] xxxxxxxxxxxx [ user-21          ] xxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxx xxxxxxxxxxxxxx x xxxxxxxxxxxxxxxxxxxxxx
xxxxxxxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxxxxxxx
FLAG USER-2         xxxxx [ user-2] xxxxxxxxxxxxxxxxxxxxxxxxxxxxx xxx
xxxxxxxxxxxxxxxxxxxxxxxxxxxxxxxxxxxxx[ user-1     ]xxxxxxxxxxxxxxxxxxx
xxxxxxxxxxxxxxxxxxxxxxxxxxxxxxxxxxxxxxxxxxxxxxxxxxxxxxxxxxxxxxxx
FLAG USER-2        [ user-1   ]                  [   user-2   ]
                     Xxxxxxxxxxxxx                  xxxxxxxxxxxxxxxxx

SEND DOCUMENT

CHOOSE A DOCUMENT | BROWSE | LIBRARY

CHOOSE A FILE FROM YOUR COMPUTER.
<FOLDER>
MUTUAL_NA.PDF
APPLICATION.PDF
AGREEMENT.DOC
OPEN

PEOPLE INVOLVED
MARTIN SAN
JUL]

DESCRIPTION

EXPIRES IN — 30 DAYS
SIGNATURE LOCATIONS AND FORM FIELDS — ON
SIGNER SEQUENCING — ON
ADD AGS — OFF

NEXT STEP

SED RUTRUM NISI NON SOLLICITUDIN MALESUADA, SAPIEN METUS CONSEQUAT NISL, EGET SAGITUS RISUS URNA IN QUAM. IN HAC HABITASSE PLATEA DICTUMST. AENEAN PLACERAT EUISMOD LACUS A IMPERDIET. SUSPENDISSE VEL AUGUE TURPIS, VEL MALESUADA NEQUE. CRAS PORTTITOR ALQUAM DIAM CONVALLIS EGESTAS. QUISQUE SUSCIPT LEO EGET LECTUS FRINGILLA POSUERE.

LOREM IPSUM DOLOR SIT AMET, CONSECTETUR ADIPISCING ELIT.PROL PURUS ORCI, HENDRERIT RUTRURM INTERDUM NON, PORTA SED LIBERO. CURABITUR RISUS ELIT, PHARETRA ET COMMODO INTERDUM, PHARETRA VEL MASSA. MAECENAS EGESTAS SEM AT MAURIS SAGITTIS VEL ADPISCING ELIT SODALES. INTEGER IN LEO EROS, A ORNARE EST.

CONDITIONS
SED RUTRUM, NISI NON SOLLICITUDIN MALESUADA, SAPIEN METUS CONSEQUAT NISI, EGET SAGITUS RISUS URNA IN QUAM. IN HAC HABITASSE PLATEA DICTUMST. AENEAN PLACERAT EUISMOD LACUS A IMPERDIET. SUSPENDISSE VEL AUGUE TURPIS, VEL MALESUADA NEQUE. CRES PORTTITOR ALIQUAM DIAM CONVALLIS AGESTAS, QUISQUE SUSCIPIT LEO EGET LECTUS FRINGILLA POSUERE.

LOREM IPSUM DOLOR SIT AMET, CONSECTETUR ADIPISCING ELIT. PROIN PURUS ORCI, HENDRERIT RUTRUM INTERDUM NON, PORTA SED LIBERO. CURABITUR RISUS ELIT, PHARETRA ET COMMODO INTERDUM, PHARETRA VEL MASSA. MAECENAS EGESCAS SEM AT MAURIS SAGITTIS VEL ADIPISCING ELIT SODALES. INTEGER IN LEO EROS, A ORNARE EST.

SUSPENDISSE SAGITTIS LOREM IPSUM DOLOR SIT AMET, CONSECTETUR ADIPISCING ELIT. PROIN PURUS ORCI. HENDRERIT RUTRUM INTERDUM NON, PORTA SED LIBERO. CURABIEUR RISUS ELIT, PHARETRA ET COMMODO INTERDUM, PHARETRA VEL MASSA. MAECENAS EGESTAS SEM AT MAURIS SAGITTIS VEL ADIPISCING ELIT SODALES. INTEGER IN LEO EROS, A OMARE EST. SUSPENDISSE SAGITTIS NISL UT MAGNA VARIUS ACCUMSAN. SED VEL TINCIDUNT EROS.

AGREEMENT
I HEREBY AGREE TO THE ABOVE LEGALESE, AND CERTIFY THAT I HAVE THE AUTHORITY TO ENTER INTO THIS AGREEMENT.

SIGNATURE: _____ 504 _____    DATE: _____ 130

PAGE 3 OF 3

FIG 12

METHODS AND APPARATUS FOR ELECTRONIC DOCUMENT HANDLING

This invention relates generally to methods and apparatus for facilitating the completion of electronic documents and more particularly to methods and apparatus for facilitating the entry of information and/or signatures into such documents. The disclosures of all of the following provisional and utility patent applications are incorporated by reference herein: U.S. provisional patent application Ser. No. 61/253,778, filed Oct. 21, 2009, entitled "Improved Systems and Methods for Document Signing"; U.S. patent application Ser. No. 12/908,827, filed on Oct. 20, 2010, entitled "Document Signing Systems and Methods," U.S. patent application Ser. No. 12/908,840, filed on Oct. 20, 2010, entitled "Computer Form Action Zone Summary System and Method," and U.S. patent application Ser. No. 12/908,847, filed on Oct. 20, 2010, entitled "Form Completion Rate Enhancement System and Method." This application does not rely for priority on the U.S. patent applications listed above nor is a claim made of benefit from the filing date of the U.S. provisional patent application.

BACKGROUND OF THE INVENTION

Businesses and individuals rely on legally executed documents in a variety of contexts, from completion of complex forms used by governments and institutions (e.g., insurance forms, car loan and purchase forms, and the like), to simple contracts between individuals (e.g., lease agreements, wills, and a host of miscellaneous arrangements), with a range of contracts in between.

Documents signed by overnight envelope take a minimum of one day to reach the recipient and an additional day to be returned. Due to intra-office distribution delays and recipients' tendency to put paper documents in to-do piles, the average cycle time using overnight envelopes is 5-7 days. Documents signed by fax have an average cycle time of 2-3 days, due to intra-office delays, procrastination of paper document tasks, and fax machine mishaps. Faced with the burden of signing a paper document and returning it by fax, scan, or mail, many recipients put it down on their desk and forget about it.

As a result, users are increasingly turning to exchanging executed documents online. These documents not only include a field for including a signature, such as the type described above, but may be more complex to include additional fields that may require the signer to initial, sign, or take some other action. However, in a large document, signers may easily lose track of how many such fields they are required to complete (i.e., sign, initial, fill with data), and how many they already have completed. Thus, when users of an online document exchange program encounter problems, such as a signer not completing a document, or a signer not understanding what actions are required, they turn to customer support. This not only slows down the completion progress of a signing event, but also increases the load on customer support.

For such complex electronic documents, signer users typically are provided with limited guidance. The signer user is expected to use general navigation techniques, such as scrollbars, arrow keys, tab buttons, and the like, to move from one information field to the next. More particularly, and in the present contexts, entry of data into information fields is hindered by the use of small screens on many devices. For example, laptop and sub-laptop computers may have screens of 11 inches (about 28 cm) diagonally measured), popularly-priced tablet computers may have screens of 7 inches (about 18 cm) or less, and, although some smart phones are being made with screens of up to about 6.4 inches (about 16 cm), many popular smart phone screens measure only 5 inches (12.7 cm) or less.

When a data entry field small enough to be seen in the context of a document is selected on such small screens and data is typed in or graphical information (such as a handwritten signature) is entered, the user may be frustrated. For example, the number of keystrokes, mouse clicks, and/or multi-finger gestures required to zoom into the field, enter data, and then zoom out so that the document can be read again may become annoying. Yet if the person who is entering this data fails to enlarge the field enough, he or she may not be able to see errors being made while typing data. Additionally, signatures or other graphic data may not be digitized accurately enough to be identifiable. Also, if a person's figure or stylus slips outside the field limits, unintended results may occur, including the termination of data entry.

Thus, there remains a need for apparatus and methods to facilitate completion of electronic documents with form fields.

BRIEF DESCRIPTION OF THE DRAWINGS

FIG. 2A is a screen shot of unsigned electronic documents as used in an embodiment of the present system and method.

FIGS. 7A and 7B are graphical representations of screenshots of an embodiment of the present invention.

FIGS. 11A-11M are screenshots of a computer performing the method.

FIG. 12 is a screenshot of a display of a computer or other display device of an embodiment incorporating a "zoom on entry" feature.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "at least one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. Also, it will be observed that a large number of features are recited in various combinations. To recite all the possible combinations of features that may be found in every embodiment would result in an excessively lengthy description. Therefore, the description herein is not intended to limit the scope of the invention to only the various combinations recited herein. The scope of the invention should instead be understood to include all possible combinations of features recited herein except those specifically excluded herein and those that have features that are inherently incompatible with one another. It will be understood that not all embodiments will necessarily achieve all the possible advantages recited herein.

Generally, the present system and method are directed to facilitating completion of an electronic document via a signer user over the internet or similar network. In particular, the present system and method facilitates completion of a scaffold electronic document that includes multiple information entry fields, which may include signature fields associated with signature entry pads, which requires completion by a signer user.

Figure 1:
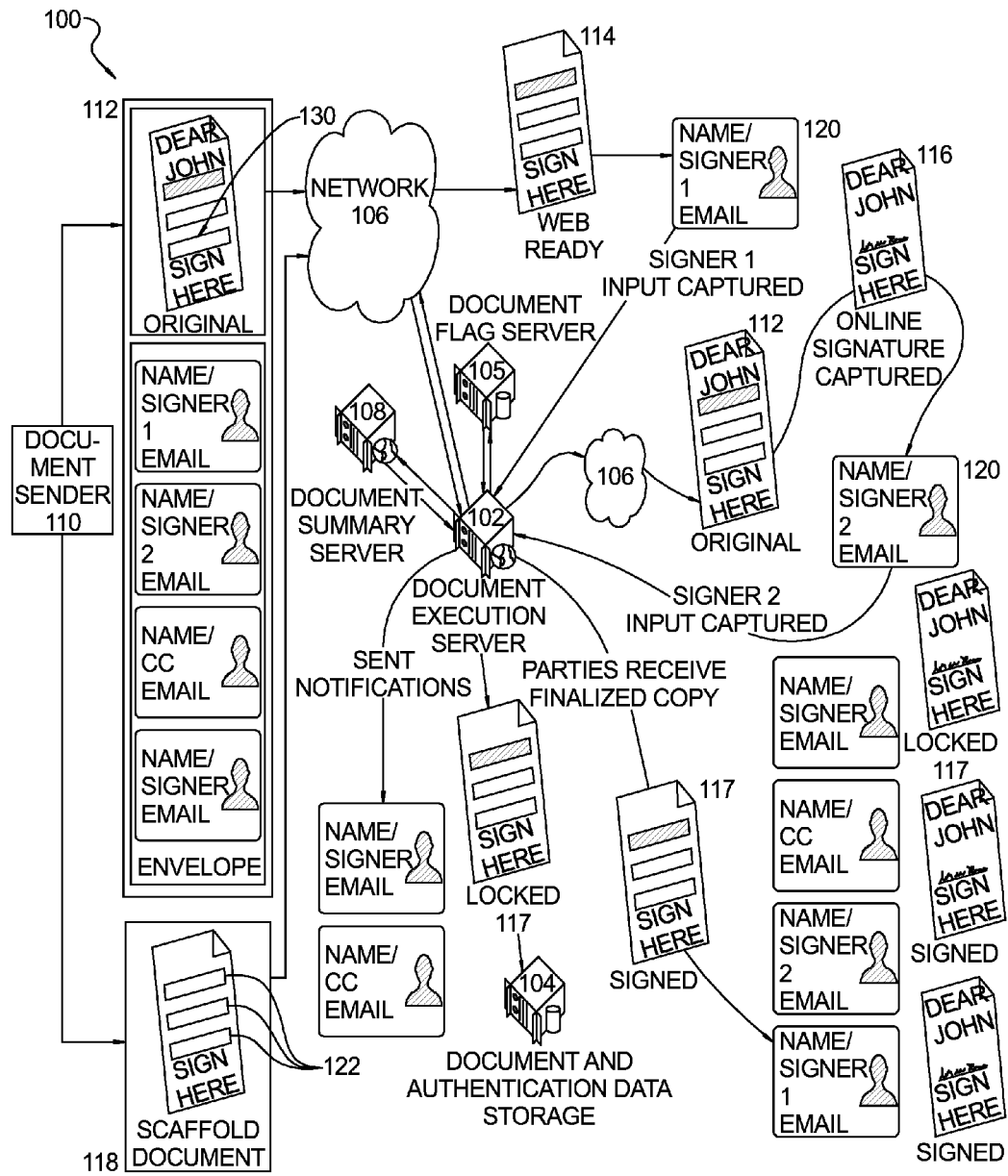
FIG. 1 shows a system chart of an embodiment of the present system.

As used herein, a signer user 120 as seen in FIG. 1 may be the document sender or one or more third parties. In addition, the term "signature field", as used herein, includes entry fields for information or data that may include signatures, signer name, unique signer identifiers, signature initials, addresses, or any other information that a document sender may identify as being acceptable forms of information for a particular signature field. For example, in one real estate transaction document, one signature field type may require entry of the signer user's full, legal name, another signature field type may require entry of the target real property address, another signature field type may include date data, and such. Thus, for example only and not by way of limitation, a "signature field" may be provided as an entry field for some form of identification, or it may be provided as a simple text entry field where a signer user 120 may insert anything.

In addition, the term "signature" includes any biometric action by a signer user, such as: freehand motion using a mouse, electronic pen, touch-screen, or any other method for detecting and recording (either temporarily or in a stored location) graphics unique or capable of being associated with a particular signer user. It may also include iris or other eye scan data, fingerprints, vocal sound or voiceprints, or other available biometrics. The freehand motion may either approximate, electronically, the signer user's traditional signature (i.e., as performed with a pen or pencil on paper), or may be a graphic that is quite dissimilar from the signer user's traditional signature.

For present purposes, a "signature field" can be thought of as a generic term for different types of fields. Examples of "signature fields" include, a "data entry field," or synonymously, an "information entry field" into which text is typed (for example), a "signature entry field" into which graphical or other data uniquely associated with a particular signer user is entered, and a "biometric field" into which a signature or other type of biometric data that is uniquely associated with a particular signer user is entered. The term "biometric field" may be considered a more generic form of a "signature entry field." The term "signature entry field" should, however, be distinguished from the more generic term "signature field." It may help to illustrate the hierarchy:

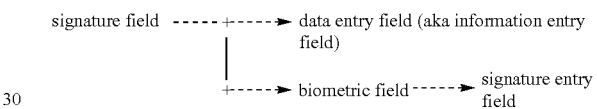

For example and referring to FIG. 1, with respect to the signing of an unsigned electronic document, some embodiments of the present system 100 include a document execution server (DES) 102 in communication with a document and authentication data storage device 104, a document summary server 108, and a document flag server 105. The document execution server 102 is configured to receive over a network 106 from a document sender 110 a scaffold document 118 that contains one or more information entry fields 122, together with additional data representative of the identities of signer users (who are to sign the electronic document) and parties to be copied (the "envelope" information).

As further shown in FIG. 1, some embodiments 100 also include a document summary server 108 in communication with the document execution server 102 and associated with a scaffold electronic document 118 via network 106, described in further detail below. The document summary server 108 facilitates the entry by a signer user 120 of information into the one or more information entry fields 122 in the scaffold document 118.

The system 100 further includes a document flag server 105 in communication with the document execution server 102 and associated scaffold electronic document 118 via network 106, described in further detail below. Referring now to FIG. 1 and FIG. 2A, the document "flag" server 105 associates one or more "flags" (a signal or alert, such as a graphical representation of a "sign here" flag) 126 with signature fields 130 in an unsigned electronic document 112, so that a signer user 120 can easily identify where a signature or other information is required to be entered in the document. In an embodiment, the document execution server 102 obtains flag data from the document flag server 105, and associates a visual flag 126 in a location on the unsigned electronic document 112 with the unsigned electronic document 112 prior to sending the document to a signer user 120.

Figure 2B:
FIG. 2B is a screen shot of unsigned electronic documents as used in an embodiment of the present system and method.

Additionally, referring now to FIG. 2B, and returning now to the document execution server 102, that server sends, or otherwise makes available the unsigned electronic document 112, with or without including an information summary indicator 124 from the document summary server 108 and/or a flag 126 from the document flag server 105, to one or more signer users 120, identified by the document sender 110. Once each target signer user 120 completes all designated signature fields for that signer user, the document execution server 102 converts the original unsigned electronic document 112 into an at least signed electronic document 116. Once all target signer users 120 have completed all designated signature fields, the input is combined to generate a signed electronic document 117. The signed electronic document 117 may be logged and stored in the document and authentication data storage device 104 for future use.

The document execution server 102 may send notifications to the document sender 110 as well as other designated signer users 120, indicating the progress of the signing activity. For example, the notifications may identify signature fields in the electronic document still requiring entry of data by one or more of the signer users.

In some example embodiments and referring to FIG. 2A, a screenshot of an unsigned electronic document 112 is presented with a graphical flag 126 in the left margin of the screen displaying the document. In some of these embodiments, the flag is a brightly-colored "tab" that includes the text "required", to identify for the signer user 120 that there is a signature field 130 along the same visual line on the screen that requires the signer user to complete. In some embodiments, the flags 126 are a graphical equivalent of a sticky label, which appear to stick out of or wrap around the edge of the document as an indicator to the signer user. In some embodiments and referring to FIG. 2B, a display of an unsigned electronic document 112 having multiple signature fields 130 is provided. The unsigned electronic document 112 includes content displayable to a signer user 120 as text, graphics, or a combination of text and graphics. The unsigned electronic document 112 includes one or more signature fields 130, into which data is entered by signer users 120 at one or more locations on the pages of the electronic document 112 using online signature entry pads 132 (shown in FIG. 11K) associated with each signature entry field 130, as described in further detail below. The location, type, and number of signature fields 130 per document are specified by the document sender 110 to the document execution server 102. The document execution server 102 associates the signature fields 130 identified by the document sender 110, and presents the unsigned electronic document 112, including all signature fields 130, to the respective signer users 120 identified by the document sender 110. In some embodiments and referring to the right side of FIG. 2B, the progress in signing (or otherwise completing the signature fields for a signer user) is indicated by an information summary indicator 124, which is shown in this FIG. 2B as a "thermometer-type" graphic. The example electronic document 112 shown in FIG. 2B is for a Chief Executive Officer signer user, displaying a signature field 130.

In at least one example embodiment, the document execution server 102 converts the original unsigned electronic document 112 into an unsigned web-ready document 114, having the same information and signature fields 130 as the original document. Unsigned web-ready documents are ready for dynamic entry of information into the signature fields 130 by one or more signer users 120. This web-ready conversion of the original documents may be achieved using standard conversion software and algorithms readily available and known to those skilled in the relevant art. For example, a Microsoft Word Document can be opened in the OpenOffice Application, exported as a PDF and then, using pdf2swf from SWFTOOLS.org, exported in Flash format, which readily is displayable in most generally commercially available web browsers. In at least one embodiment, the unsigned electronic document 112 is exported using similar tools into PNG files, which are supported by commercially available web browsers, and which technology is available in services such as DOCSTOC.com and SCRIBD.com.

After receiving the original unsigned electronic document 112 and, as applicable, converting the document to an unsigned web-ready document 114, in an example embodiment, the document execution server 102 makes available, via a network, either the original, unsigned electronic document 112 or the unsigned web-ready document 114 to a signer user 120, together with an online signature entry pad 132 associated with each signature field 130 in the unsigned electronic document 112. In an embodiment, the document execution server 102 makes the unsigned electronic document 112 available to multiple signer users 120, either simultaneously or serially, depending on instructions from the document sender 110, or other external, predetermined parameters and input. In at least one example embodiment, the document execution server 102 delivers the unsigned electronic document 112 (or a link thereto) via an application programming interface (API) for access by predetermined signer users. In another example embodiment, document execution server 102 delivers the unsigned web-ready document 114 (or a link thereto) via the API.

In at least one embodiment, also as shown in FIG. 1, the document summary server 108 may send a scaffold document 118 via email or other electronic transmission to one or more signer users 120. The same scaffold document 118 is made available to multiple signer users 120 either in a web ready format, via email, via a link through an API, or using other electronic means, as may be desirable for each signer user 120, as is the case with any unsigned electronic document. For example, in one embodiment, a link to a document 118 is emailed by document summary server 108 to one or more signer users 120, where the link provides access to a webpage containing or otherwise providing access to a web-ready document.

Figure 3:
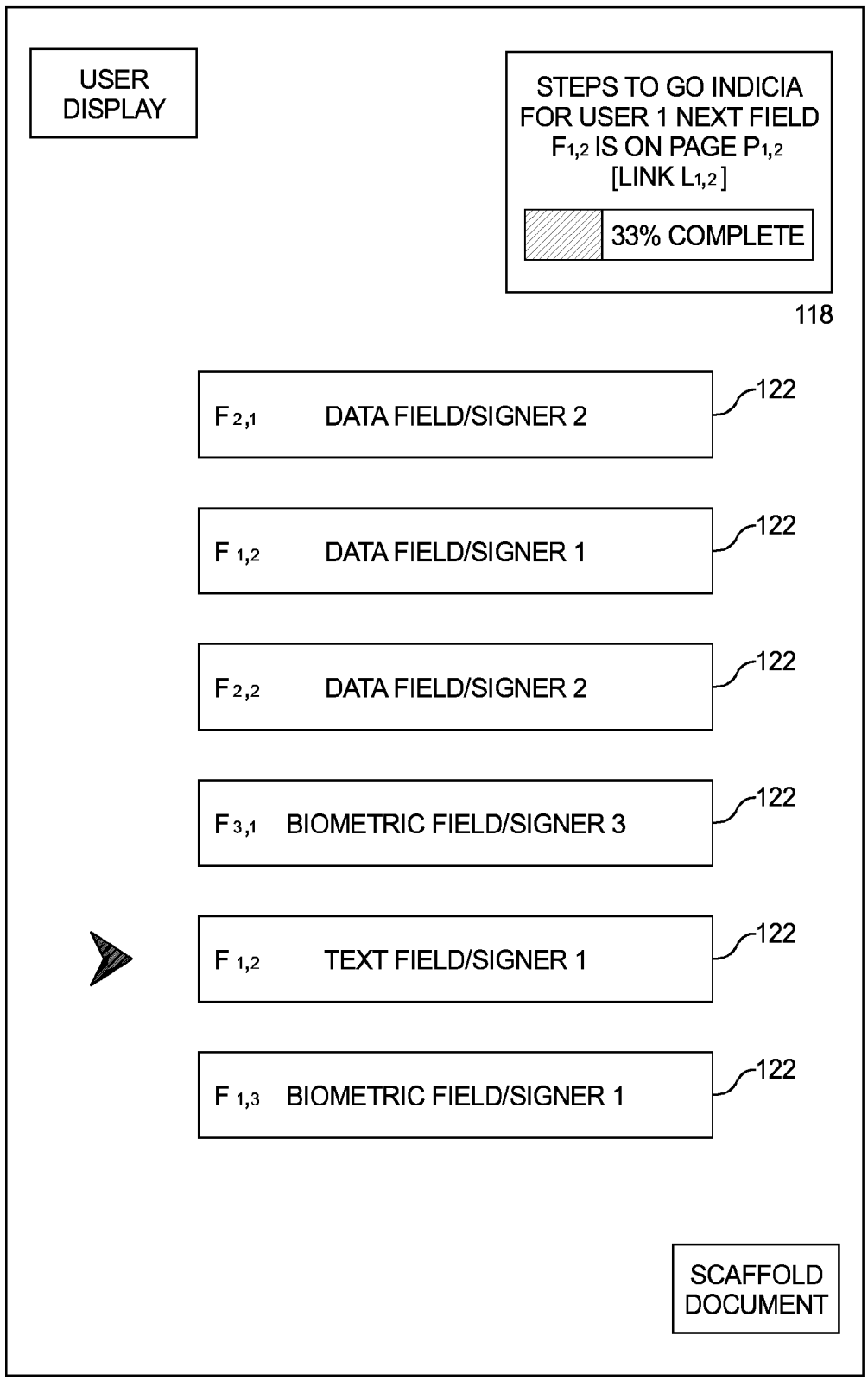
FIG. 3 is a screen shot of an unsigned electronic document as used in an embodiment of the present system and method.

FIG. 3 shows an embodiment of an electronic scaffold document 118 of the present system and method. As shown, the scaffold document 118 includes multiple and different fields F for the $i^{th}$ user $U_i$. In this illustrated embodiment, the document sender 110 designates a number of text fields, data fields, biometric fields, or others that are associated with each signer user 120. In the example, there are three signer users m=3. For the first signer user $U_1$, there are three fields to fill (n=3). Thus, $F_{2,1}$ corresponds to the first signature field 130 for the second signer user 120. Similarly, $F_{1,1}$ corresponds to the first signature field 130 for the first signer user 120, and so forth.

In response to receipt of the signature data from one or more of the signer users 120, the document execution server 102 generates a signed (or otherwise "filled-in" or completed) electronic document 117 corresponding to the unsigned electronic document 118 and including the signature data.

In an embodiment, the signed electronic document 117 then is made available by the document execution server 102 to all or a predetermined subset of the signer users 120 and to the document sender 110 for verification, confirmation, and other predetermined actions. In an embodiment, the document execution server 102 transmits the signed (or otherwise completed) electronic document 117 (in a "locked" form) to a document and authentication data storage device 104.

In an embodiment, the document summary server 108 establishes a group index i for each of the m groups of information entry fields F 122. For purposes of this document, we use the following definitions. With respect to signer users 120, m=number of users/groups of user fields, (e.g. the number of participant signer users), wherein $1<=i<=m$. In addition, $U_i$ represents the $i^{th}$ signer user. In referencing signature field groups for a signer user, $F_i$ is the group of fields required to be "filled in" by the signer user $U_i$, i.e., for the $i^{th}$ signer user. $I_i$ is the incomplete (i.e., not "filled in") required fields for $U_i$. $C_i$ is the required fields completed by $U_i$. When a field $F_{i,j}$ is fully filled in, then $I_{i,j}$ becomes an empty entry which is ignored for counting purposes and skipped when iterating through elements. The same is true for $C_{i,j}$. Counts are represented as: $|F_i|$ is the total required field count for $U_i$; $|I_i|$ is the incomplete required field count for $U_i$; and $|C_i|$ is the completed required field count for $U_i$ all at any given time.

Individual fields are represented as: $F_{i,j}$ is the field j for $U_i$; $P_{i,j}$ is the page number on which $I_{i,j}$ appears; $L_{i,j}$ is the actionable link to bring $F_{i,j}$ to the viewport (for example, if $F_{i,j}$ is offscreen to a signer user 120, clicking a link $L_{i,j}$ will bring $F_{i,j}$ into the middle of the user screen and make the field active for input by the sender user 120; and $Z_{i,j}$ is the visual indicator of next $I_{i,j}$ to be completed by the signer user. Thus, $1<=j<=|F_i|$.

Upon receiving a scaffold document 118, from a document sender 110, the document summary server 108 establishes a group index i for each of the m groups of information entry fields, where $1 \le i \le m$, and establishes a subgroup index $j_i$ for the $i^{th}$ group of information entry fields $I_{i,ji}$ of the respective m groups, where $1 \le i \le m$ and where $1 \le j_i \le n_i$, wherein and $j_i$ for the $i^{th}$ user have initial values equal to 1 for the scaffold electronic document, and i and $j_i$ have maximum values equal to m and $n_i$ respectively for the scaffold electronic document. The document summary server 108 makes available over the network 106, a version of the scaffold document 118 to one or more signer users 120. The scaffold document 118 is displayable to each signer user 120 to allow the signer user 120 to identify the information entry fields 122. As used herein, the term "information entry field" has the same meaning as "signature field;" however, the term "information entry fields" is preferred in reference to scaffold documents, and the term "signature fields" is preferred in reference to any unsigned electronic document.

Figure 4A:
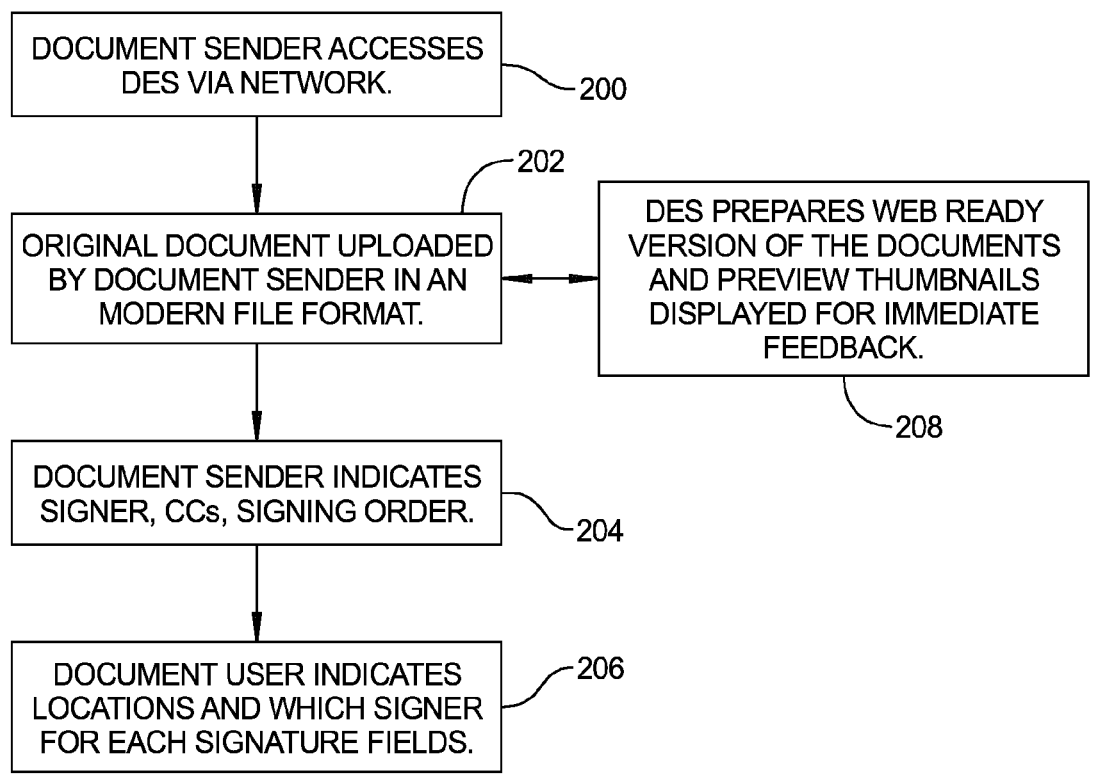
FIGS. 4A-4C are a flowchart of an embodiment of the present method.

The flowchart of FIG. 4A further illustrates an embodiment of the present method. As shown, a document sender accesses 200 the document execution server 102 via a network, such as the internet. The document sender then uploads 202 the original electronic document to the document execution server (DES). The document sender then indicates 204 the name and contact information of each signer user, each entity that will receive a copy of either the unsigned electronic document and/or the signed electronic document, and any order in which the signature fields contained in the subject document are to be completed by the designated signer users. The document sender also indicates 206 at this time, the locations of signature fields within the unsigned electronic document, together with instructions regarding which signer user is required to complete which corresponding signature field. With multiple signer users, different signer users generally are required to complete different signature fields, as well as different signature field types. For example, in a real estate transaction, the buyer may be required to provide a signature, a personal address, and a date, whereas an escrow agent may be required to provide a signature, a license number, and financial information.

As shown in FIG. 4A, in an embodiment, the document execution server prepares 208 a web-ready version of the original document. The document execution server also may generate thumbnail displays, flags, or other indicia, associated with the various signature fields for easier review by the signer user and a more expedient signer user completion of the designated signature fields.

Figure 4B:
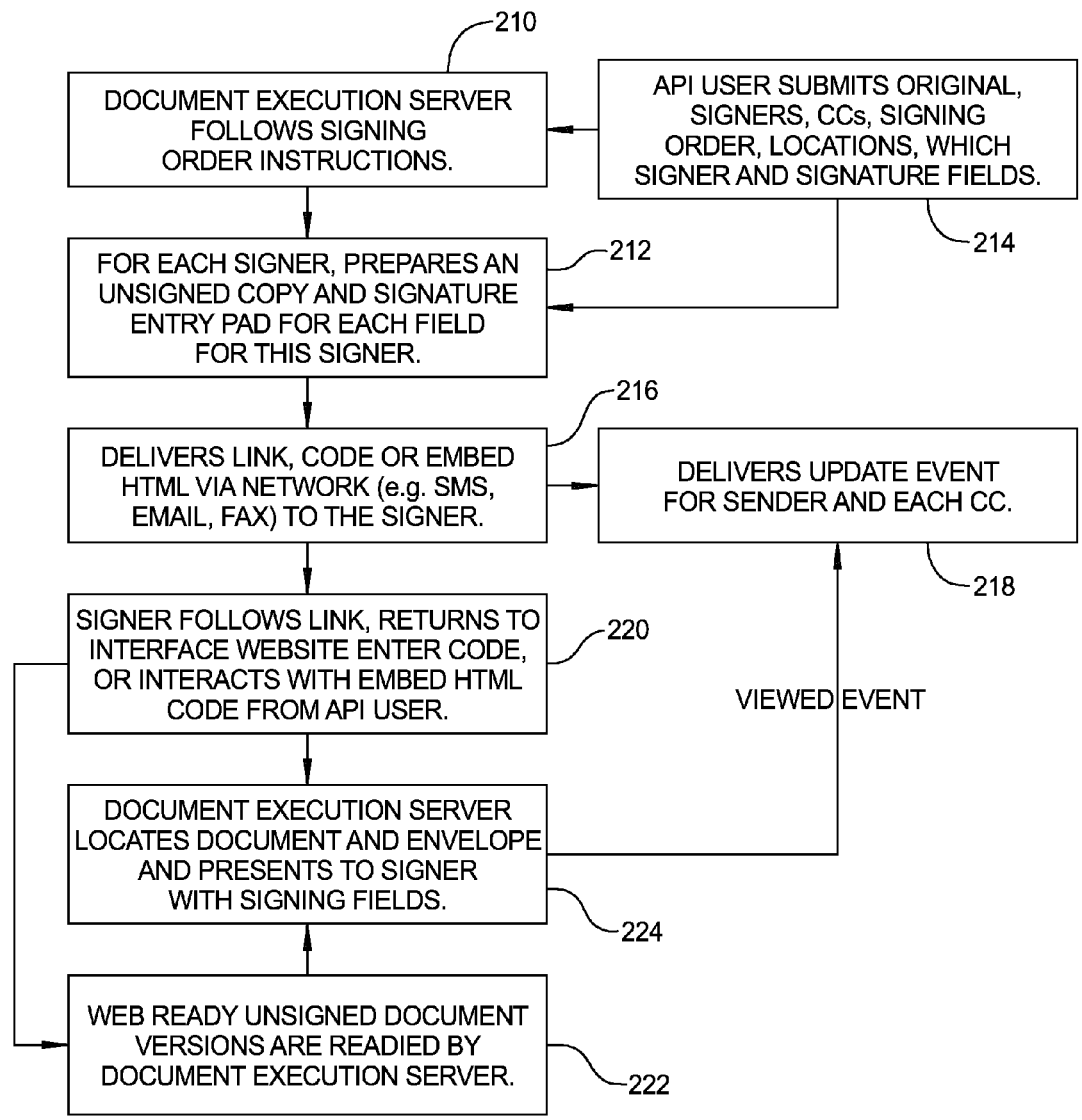

Turning to FIG. 4B, once the document execution server receives the original document, together with the additional document information from the document sender, the document execution server follows 210 the signing order instructions sent by the document sender. For each designated signer user, the document execution server in effect prepares 212 an unsigned electronic document associated with the original document, and a signature entry pad for each signature field. All such information regarding the signer user and instructions related to the document, are collectively referred to the "envelope" of the electronic document. Additional envelope information may include data associated with the identity of the signer user, such as email address, IP address, SMS address, facsimile number, or other electronic forms of address or identification. This envelope is integrally associated with the original document and, as such, remains part of the associated electronic and web-ready versions of the same document as such are generated by the document executive server.

In at least one embodiment, an API user, such as another internet-based device, is the document sender, which submits at 214 the original document, and the associated signer user, copied users, signing order, signature field locations, and signature field authorizations to the document execution server. In an embodiment, the API user receives delivery of the unsigned web-ready documents on behalf of the designated signer users.

Once the unsigned electronic document is prepared, the document execution server delivers at 216 an internet link, code, or embedded HTML via a network to the designated signer users. The network includes SMS, email, facsimile, and other available technologies for distributing data. At a proximal time the document execution server in effect transmits the unsigned electronic document to the signer users. The document execution server may deliver updates 218 of the event to the document sender and other designated entities to be copied on such transmission. In this manner, the document sender can begin to track the progress of the document as the designated signer users complete the signature events.

Once the link, code, embedded HTML, or other contact is made by the document execution server to a signer user, that signer user then accesses at 220 the unsigned electronic document by following such link, returning to the website interface for the document execution server, interacts with the embedded HTML code from the API user, or otherwise opens the unsigned electronic document. The document execution server locates at 224 the unsigned electronic document, together with its associated envelope information, and presents the same to each signer user.

In an embodiment, web ready unsigned document versions are readied at 222 by document execution server 102.

Figure 4C:
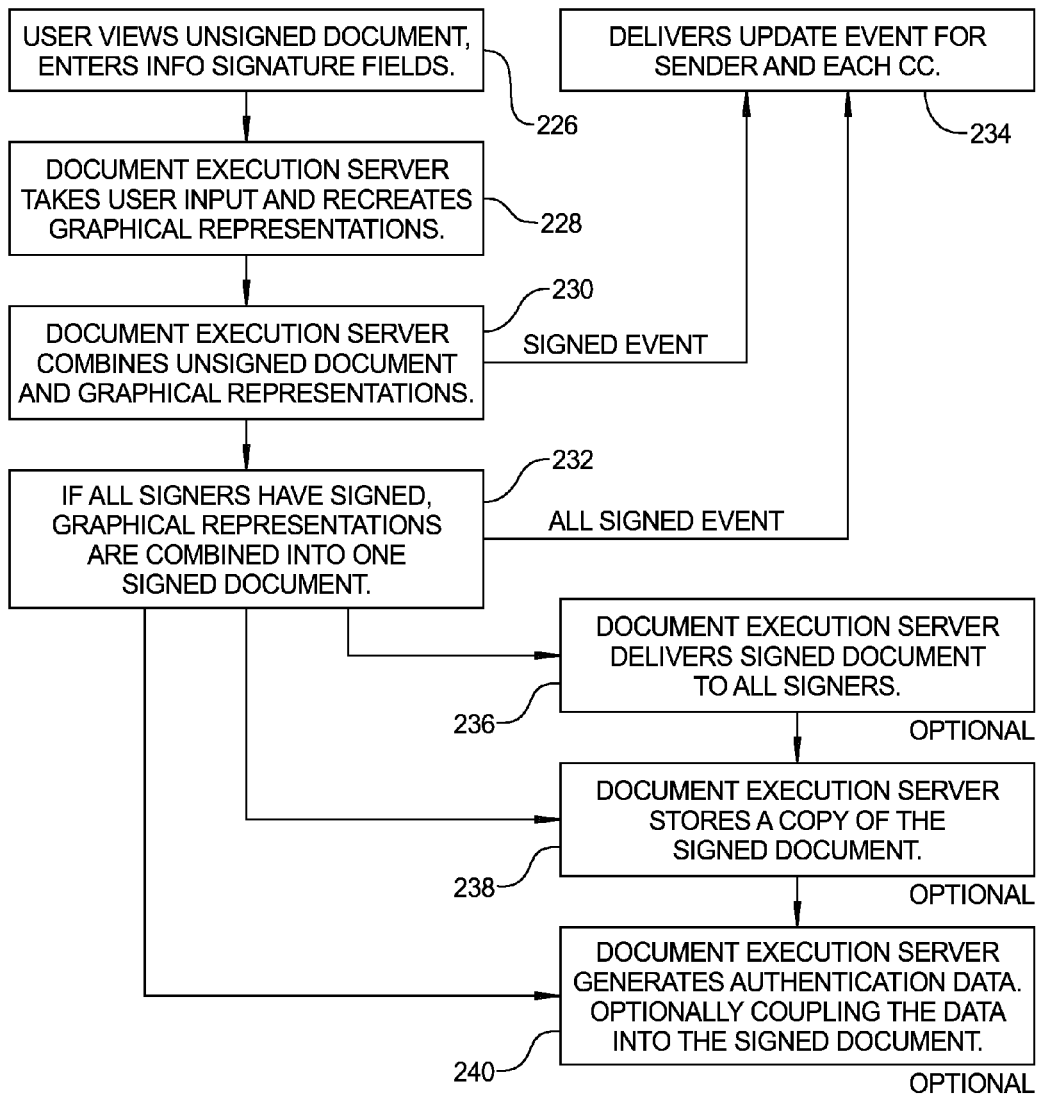

As shown in FIG. 4C, the signer user views at 226 the unsigned electronic document, and enters the information requested in each of the signer user's respective signature fields. Information is entered into the signature field by the dynamic online signature entry pad associated with each signature field. Signature entry pads are dynamic fields that appear on the GUI to facilitate signer user entry of information required for the associated signature field. Such information may be entered using a touch pad, mouse, touch-screen, voice entry, and other technologies generally commercially available.

Upon receipt of the entered information, the document execution server creates at 228 a graphical representation of the signature field input received from the signer user. The document execution server then (or at desired times) in effect combines at 230 the graphical representations with the unsigned electronic document to generate a signed electronic document, to define a signed event. In parallel with receiving the signature field input from the signer users, and with generating each signed electronic document, the document execution server delivers 234 updates on the progress of the signing events to those entities identified as "cc", or copied entities, as well as to the document sender. Once all signers have completed signing the document, all graphical representations of all signature field input received from all signers is combined 232 into a single signed document.

In some embodiments, and as shown in FIG. 4C, the document execution server then delivers at 236 a copy of the signed electronic document to each of the designated, or selected ones of the signer users associated with that document. In an embodiment, the document execution server optionally locks and stores at 238 a copy of the signed electronic document, or may send a copy to a document and authentication data storage device for storage. In an embodiment, the document execution server generates 240 authentication data associated with the signed electronic document. Such authentication data may be data incorporated into the signed electronic document, it may be part of the document envelope, or may be some additional data used only for authentication purposes.

Figure 5:
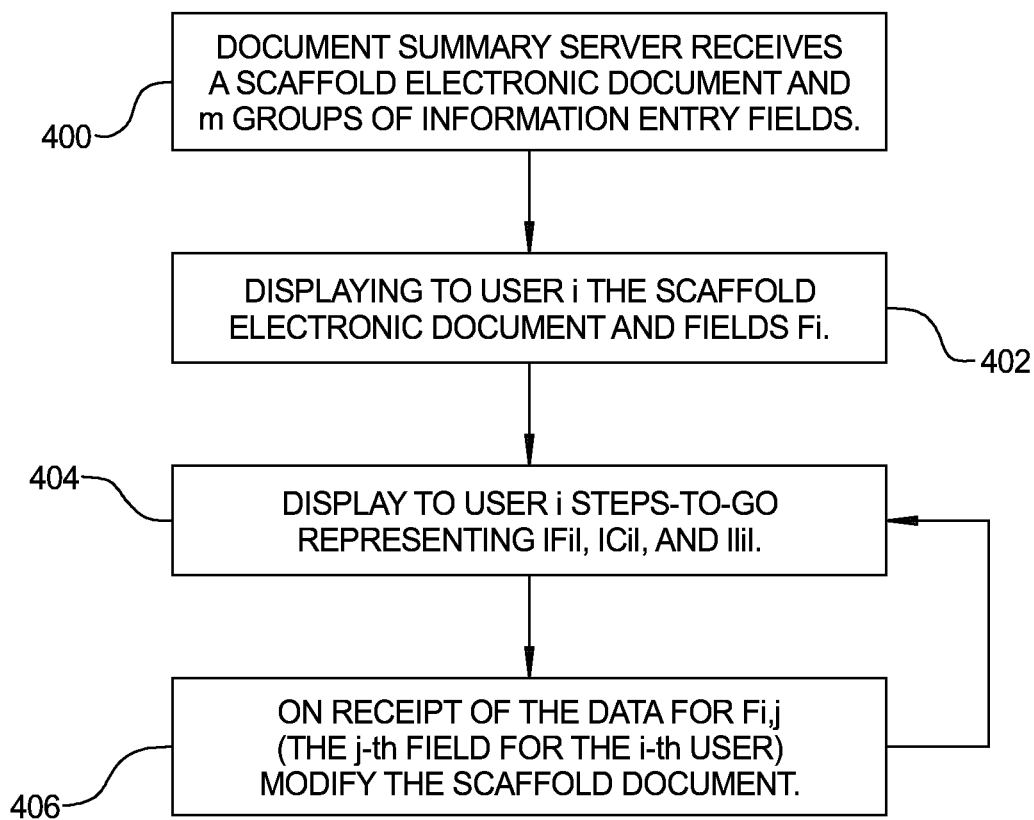
FIG. 5 is a flowchart of an embodiment of the present method.

In at least one embodiment of the present method in which a document summary server is used, and referring to FIG. 5, once the document summary server receives at 400 a scaffold electronic document and m groups of information entry fields, the scaffold and fields $F_i$ then are displayed at 402 to a user $U_i$. The display step includes displaying 404 a visual representation of steps-to-go, representing $|F_i|$, $|C_i|$, and $|I_i|$. Such visual representation may be permanent, dynamic representations, such as text, appearing at the top or side of the screens, or user-selective representations, such as text appearing in pull-down menus on the screen. In at least one embodiment, such visual representations may be in the form of dynamic graphical displays, such as a "thermometer"-type graphic, a numerical, button, or other graphic countdown display, color displays, such as red "buttons" representing incomplete information entry fields and green "buttons" representing completed information entry fields. On receipt 406 of data for $F_{i,j}$ (i.e., the $j^{th}$ field for the $i^{th}$ user), at 406 the user receives an updated display 404, with the steps-to-go indicator iteratively adjusted to reflect the number of information entry fields remaining to be completed and/or the number of information entry fields completed.

An example of an embodiment of the type described in the preceding paragraph updates progress indicators (i.e., indicators showing a user $U_i$ how many fields remain to be filled in) are updated in "real time." In this example, "real time" means the progress indicators comprise "front-end" code, wherein field data filled in by user $U_i$ is not transmitted to a server immediately, but rather is stored temporarily in a data store local to and accessible by the browser (i.e., the "front end") used by user $U_i$, and the progress indicators update in accordance with the temporarily stored data. After all required data fields are filled and the user $U_i$ clicks on a "submit" button in the browser, the browser submits all of the data field data from the local store to the server at once. In such embodiments, the phrase "on receipt of data" in step 406 refers to the receipt of data by the browser and the update of the "steps to go" indicator requires only the "front-end" code running in the user's browser.

Figure 6:
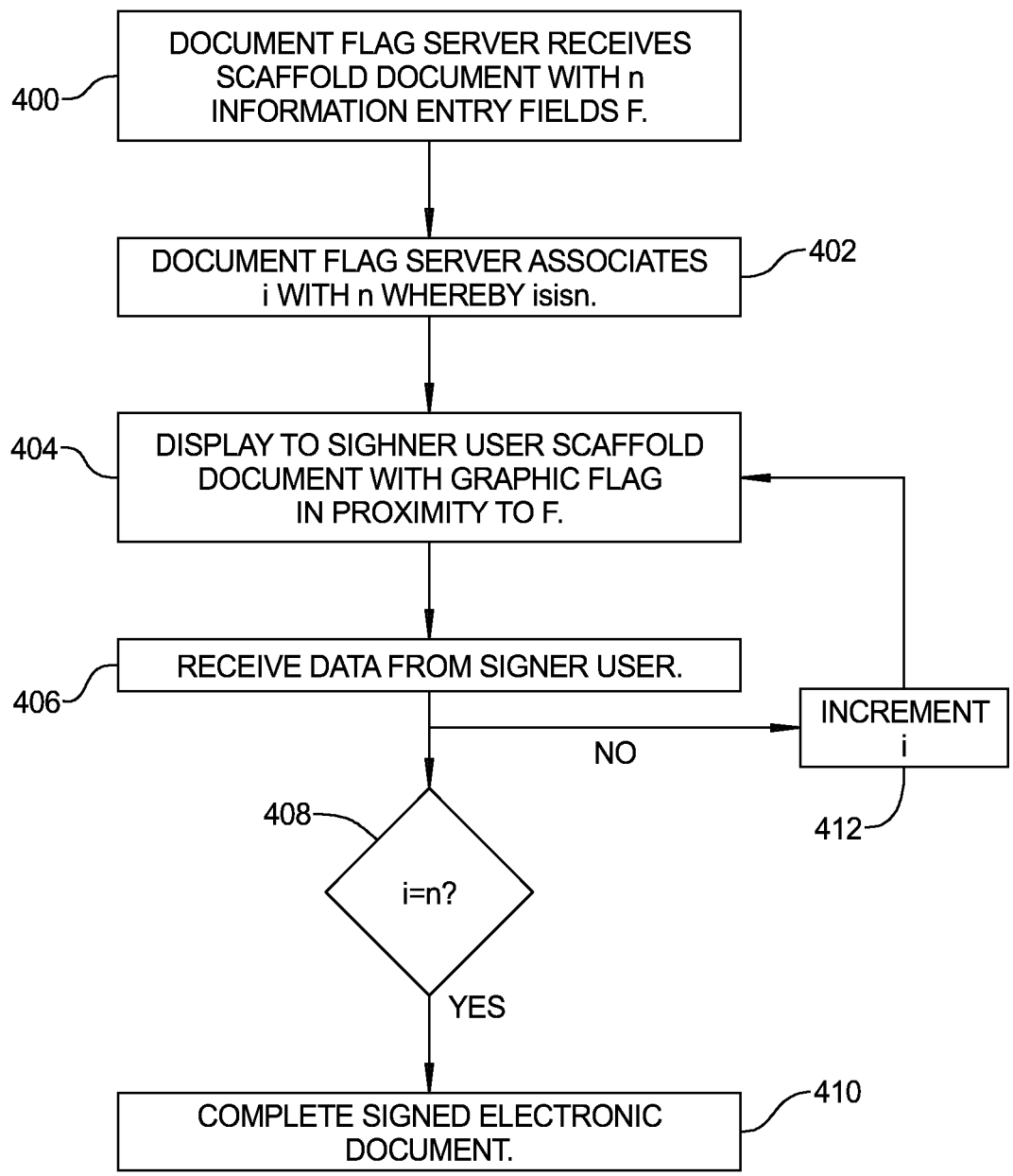
FIG. 6 is a flowchart of an embodiment of the present method.

FIG. 6 shows an embodiment of the present method in which flags are associated with information entry fields. As shown in that embodiment, the document flag server receives 400 a scaffold document having n information entry fields $F_1$ to $F_n$. The document flag server associates 402 an index value i with each information entry field in the scaffold electronic document. Index value i is set to equal the value 1, and the unsigned electronic document is displayed 404 to the signer user, which document includes a flag at F. Data then is received 406 from the signer user. If query 408 whether i=n is resolved in the positive, then the document will be treated as a signed electronic document and the process is complete 410. If query 408 is resolved in the negative, then i is incremented 412 and the unsigned electronic is displayed 404 again to the signer user, again with a flag associated with an information entry field $F_{i+1}$ until all information entry fields are presented to the signer user. In some embodiments of the present invention, information entry fields $F_1$ to $F_n$ include some fields that are designated as "optional" and thus, do not have to have data entered by one or more users $U_i$ or possibly any user $U_i$. Also, the submission of a "completed" document (which may include uncompleted optional information entry fields) need not be done automatically. Rather, in some embodiments, a designated information field such as the final field $F_n$ contains a "submit" button, either alone or in conjunction with a signature entry field, to cause the browser to send the completed document (with at least all of the mandatory information entry fields filled in) to a server.

In at least one embodiment, the flags 126 are successively located in the unsigned electronic document 112 with increasing index i, or are located in the unsigned electronic document 112 independent of the index i. In an embodiment, the flags 126 are located in the document based on an order predetermined by a document sender, or document envelope information provided by the document sender to the document execution server. In at least one embodiment, the flags are located in the document based on an order determined by a signer user or a third party.

FIG. 7A shows an example of a screen display in one embodiment having graphic flags 126 associated with a first user (user 1), $U_1$. The flags 126 are shown in the left margin, indicating that user 1 is required to make an entry in the information entry fields 122 (set off by square brackets) in the lines adjacent to the respective flags 126. In various embodiments, the flags 126 can be in the form of an arrow, an asterisk, or some other icon, and may be in indicative colors to make the flags readily identifiable by the signer user 120.

FIG. 7B shows an example of a screen display in one embodiment having flags 126 associated with a second user (user 2), $U_2$. The flags 126 in this FIG. 7B are similar to those in FIG. 7A, except that the flags 126 in this FIG. 7B indicate that user 2 is required to make an entry in the information entry fields 122 (set off by square brackets) in the lines adjacent to the respective flags 126.

In at least one embodiment, the flags 126 for $U_1$ and $U_2$ may all appear in the same document, where the flags associated with $U_1$ are a different color or shape than the flags 126 associated with $U_2$. In at least one embodiment, the flags 126 for $U_1$ and $U_2$ may be the same color, but the flags may be specific icons associated with the respective signer users.

In an embodiment having a document with multiple signature fields, the flags 126 may be dynamic, such that they move from signature field-to-signature field as the signer user 120 completes each field. In another embodiment, a page with multiple signature fields 130 may include several flags 126 indicating simultaneously all signature fields 130 on the page. Then, when a signer user 120 completes a signature field 130, the associated flag 126 disappears—all flags 126 disappear once all signature fields 130 in the unsigned electronic document 112 are completed by the signer user 120. In a scaffold document 118, the flags 126 may be different graphical colors or shapes to indicate different information entry fields 122. For example, flags associated with information entry fields requiring name data graphically appear as blue flags, flags associated with information entry fields requiring date data graphically appear as green flags, and the like.

Figure 8:
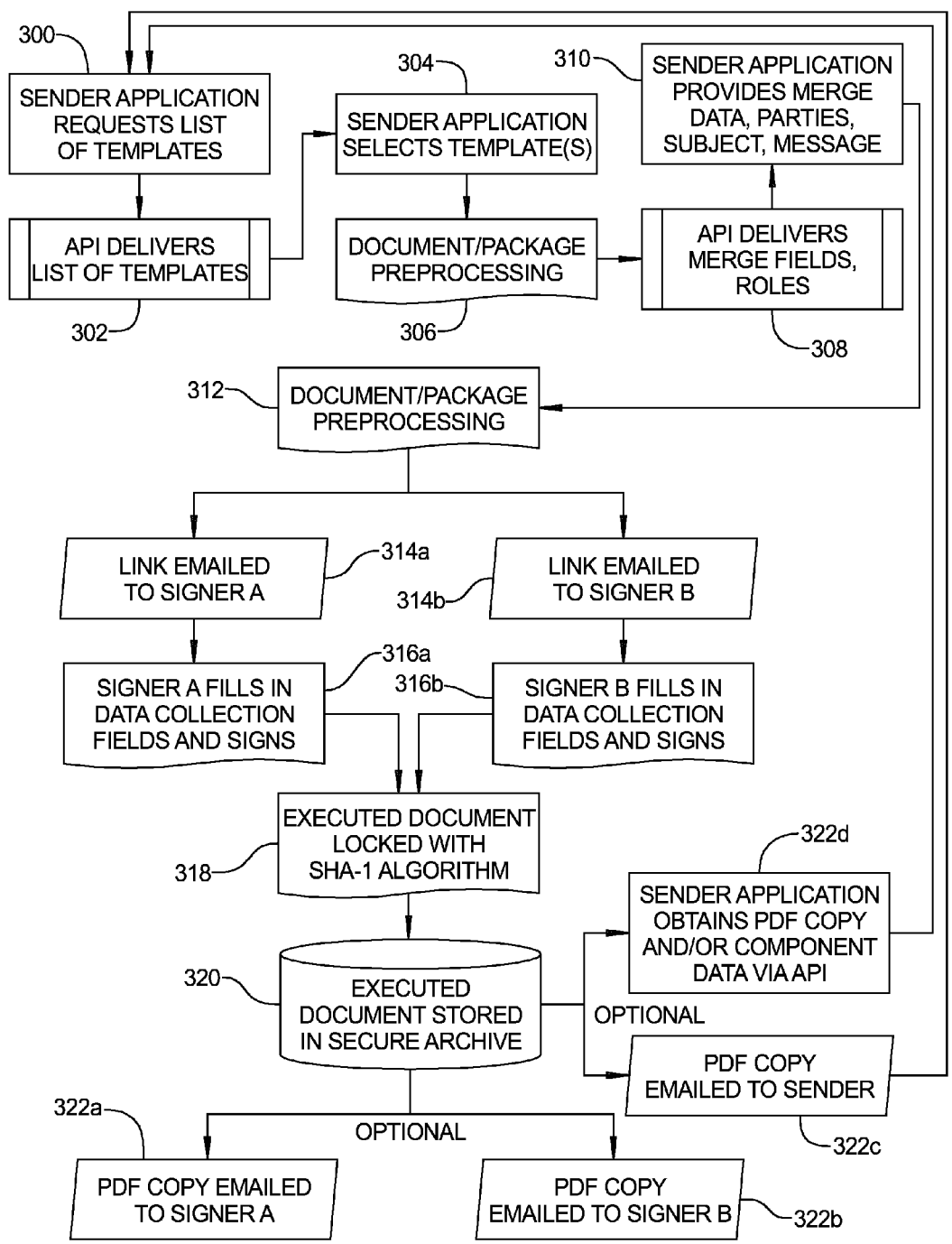
FIG. 8 is a flowchart of an embodiment of the present method.

In at least one example embodiment of the present method, the scaffold document 118 is one selected from predetermined template documents created by third party entities, or the administrator of the present method, and stored in the document execution server for use by customer/document senders via API. In such an embodiment, as shown in FIG. 8, a document sender, or an application used by a document sender, requests 300 a list of template electronic documents. Such template documents have predetermined signature fields, which are not generally changed or changeable by the document sender. An example of such an embodiment would be form lease agreements, or other standard forms. In another example embodiment of the present invention, template documents are sent via a web user interface (UI) as opposed to an application programming interface (API). In yet another example embodiment, template documents can be sent either via a web user interface (UI) or by an application programming interface (API).

Upon receiving the request, the document execution server delivers 302 via API (or via UI), a list of available templates to the sender user. The sender user application selects 304 a template. Upon receipt of the sender user template choice 304, the document execution server performs document package pre-process 306. This pre-process generates a document ID associated with the template. It is possible that many document ID's are associated with each template, and each unique document (having an assigned unique document ID) likely will have a unique envelope. The API then delivers 308 the merge fields and roles associated with the envelope for the designated template. The sender user application provides 310 merge data, information relating to the signer users, and other information and data required for the designated template. In this example, the template is the unsigned electronic document identified and discussed above. The document execution server processes 312 the unsigned template document, in a manner similar to that described above, and sends links 314a, 314b via email to each designated signer user. Each designated signer user provides 316a, 316b the information required for each signature field. For signature fields designated as optional to one or more signer users by the sender user, the information may be left blank by the associated signer user(s). Upon receipt of all required signature field data (and whatever optional signature field data that may be entered), such data is incorporated into an unsigned template document, and the document execution server locks 318 the resulting signed electronic document, as described above in further detail.

At that point, the signed electronic document may be stored 320 in a document and authentication data storage device, and copies of the signed electronic document sent at 322a and 322b to the document sender at 322c, and others as designated by the document sender at 322d.

In some embodiments, sender users select a template unsigned electronic document from a website, from the user's own library, or from secondary sources. In at least one embodiment, the step of processing the document 312 is followed by an API (or UI) delivery of embedded signing codes. In at least one embodiment, all communications between the document sender and the document execution server, or between the document execution server and one or more of the designated signer users, is via email, facsimile, SMS, and other electronic communications methods generally available. As used herein, an "embedded signing code" is a code that is inserted into the HTML code of an existing third party webpage to display a document signing event (e.g., in an iFrame) inside the third party webpage. This type of code may be similar to, but not necessarily the same as, an embedded code provided by YOUTUBE®.

Figure 9:
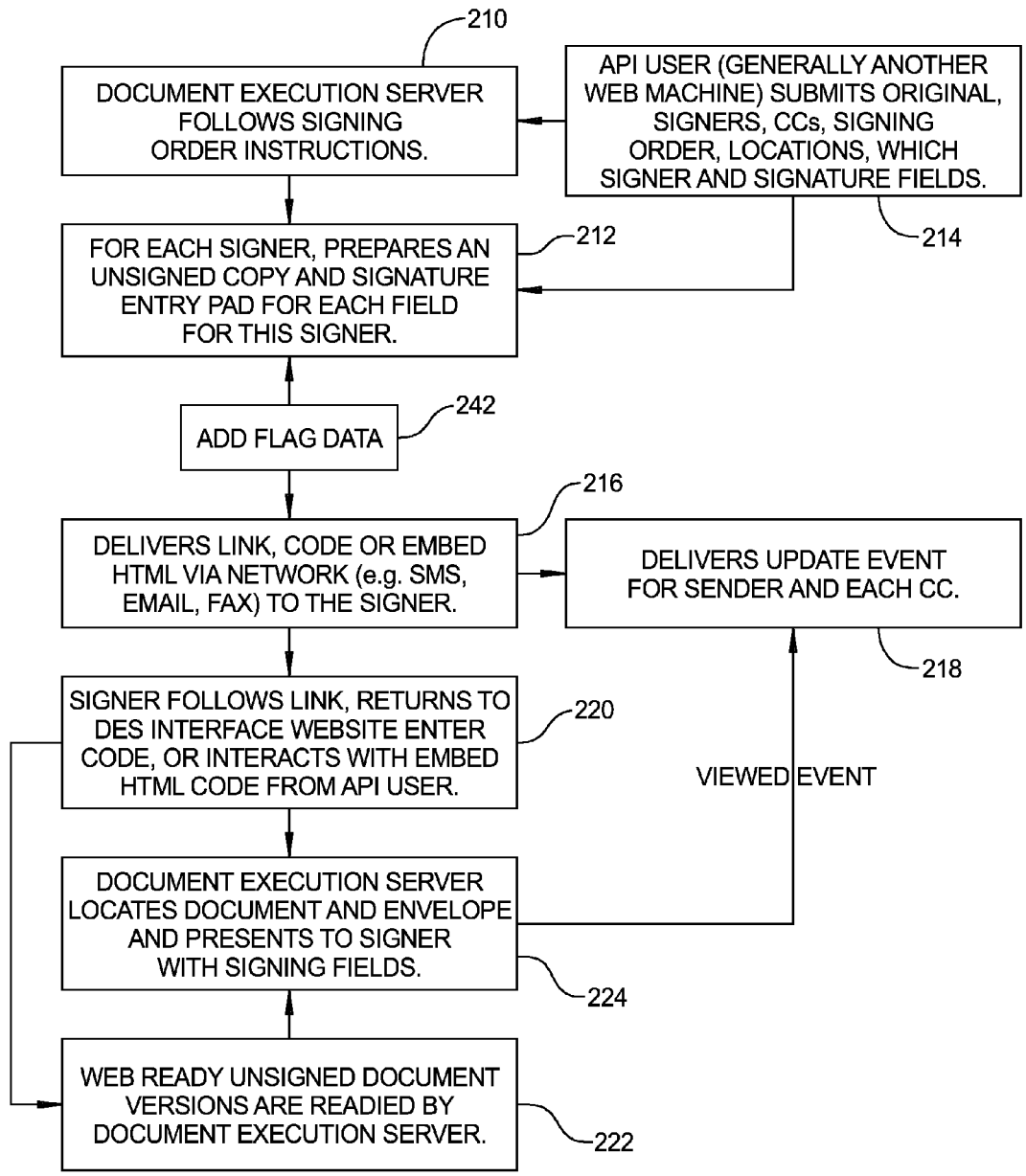
FIG. 9 is a flowchart of an embodiment of the present method.

In at least one embodiment, as shown in FIG. 9, the document execution server, prior to delivering 216 the unsigned electronic document to the signer user, modifies 242 the unsigned electronic document to include flag data to successively identify to each respective signer user the signature fields in that unsigned electronic document which required data entry. This flag data is removed in one example embodiment when the document execution server combines 230 the unsigned document and graphical representations of signature field data to create the signed electronic document.

Figure 10:
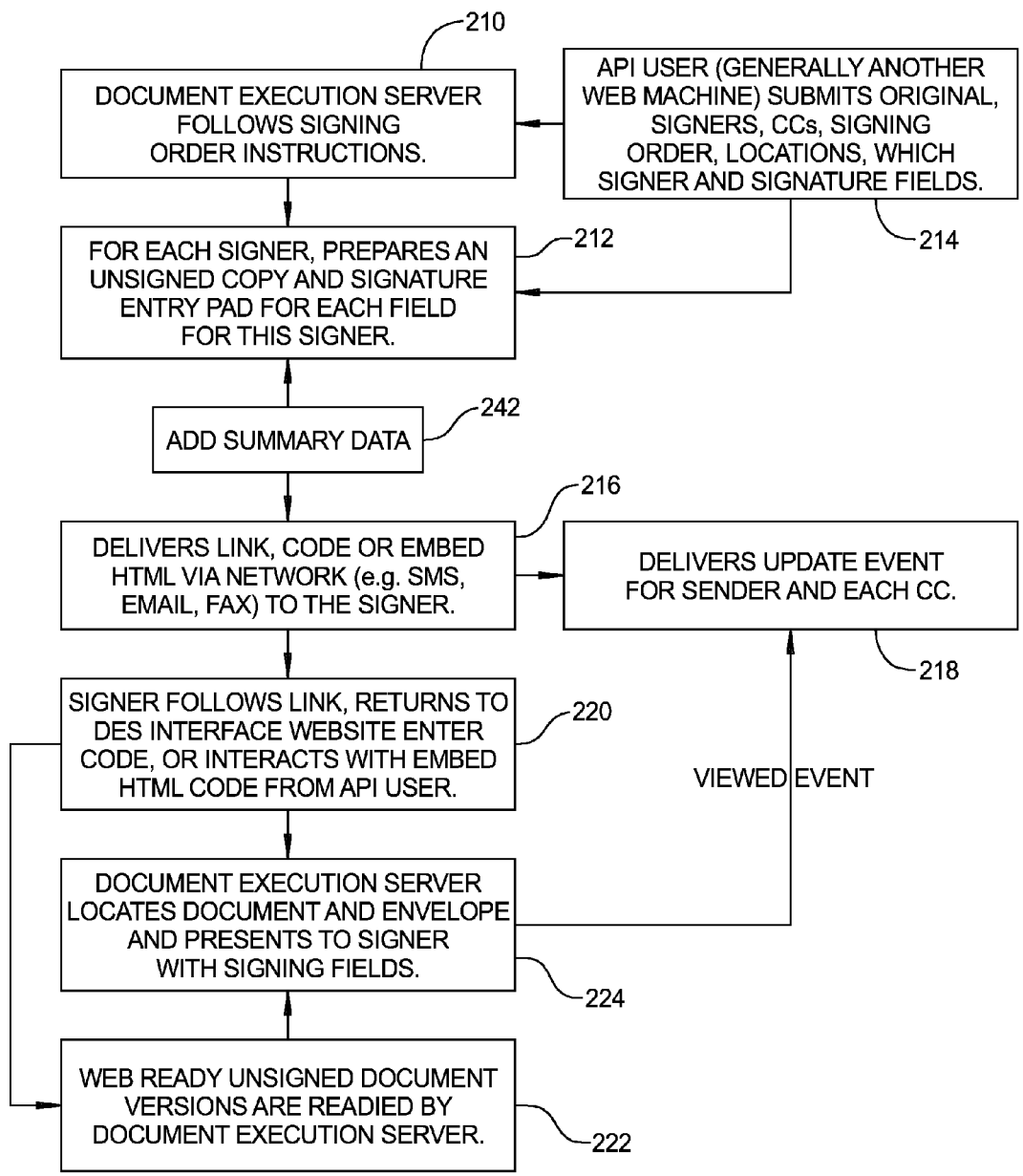
FIG. 10 is a flowchart of an embodiment of the present method.

In at least one embodiment, as shown in FIG. 10, the document execution server, prior to or contemporaneous with delivering 216 the unsigned electronic document to the signer user, modifies 244 the unsigned electronic document to include summary data, represented by an information summary indicator 124, associated with the document to assist signer users identify the locations of signature fields in the electronic document. Such information summary indicator 124 is presented in a side menu to the document, appears visually on the same page as a signature field, or is presented anywhere on the visual periphery of document pages. The information summary indicator includes such indicators as the total number of signature fields in the subject document, the number of signature fields that have been completed, the number of signature fields remaining to be completed, or any combination of such data. In at least one embodiment, the information summary indicator 124 is presented graphically as a bar, as buttons, as text, as color indicators (e.g., red for incomplete signature fields; green for completed signature fields), and the like. In an embodiment, the information summary indicator 124 is static, by presenting location identification data (e.g., page, paragraph information) associated with each signature field, or by presenting the total number of signature fields contained in the subject document. In at least one embodiment, the information summary indicator 124 is dynamic, changing as the signer user completes each signature field. In some embodiments, information summary indicator 124 is superimposed on the unsigned electronic document itself. For example, an entire page of a document may be color tinted to indicate the density of fields, or a colored vertical bar is imposed on one side of a page, e.g., the right side.

Figure 11A:
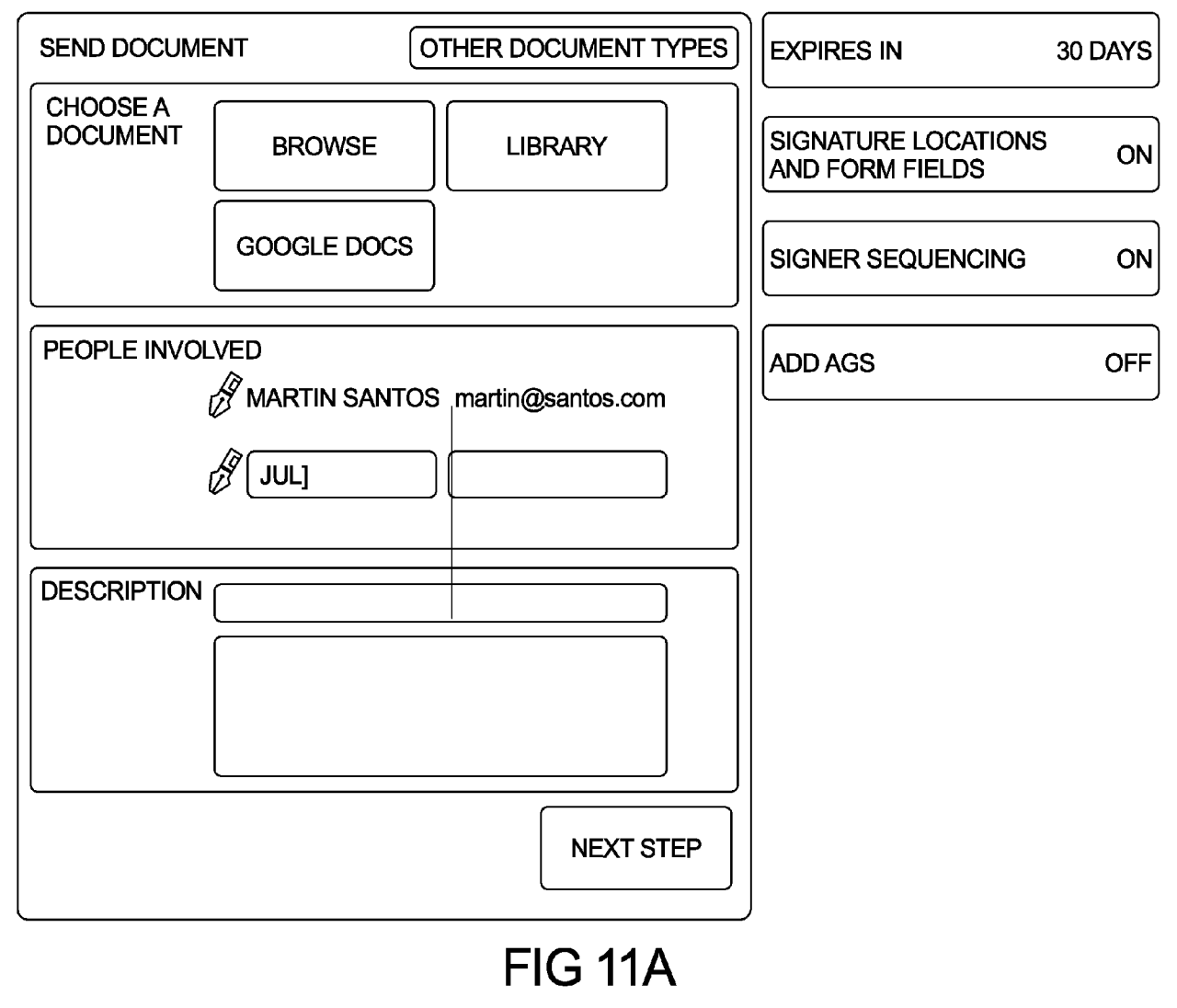
Figure 11C:

Turning now to FIGS. 11A-11M, this series of screen shots shows an exemplary embodiment of the present system and method. FIG. 11A shows a start-up/home screen for a website using the present system and method. Note that the sender user is prompted to "Choose a Document", name the "People Involved", (aka signer users), and enter a document "Description." In FIG. 11B, the sender user viewing this screen selects an "NDA" document from a selection of available template documents. The document sender may also import a self-generated document, or select a document from another source, as available.

FIG. 11C shows that a signer user has been selected, "Martin Santos", having an associated email address. The document sender may select from a library of contacts stored in association with the document sender's account information at the website, may manually enter the signer user contact information, or may otherwise import the information from a source. Note that to the right of the screen, the document sender has the option of associating an expiration date with the selected document. This expiration date is that date on which a signer user no longer can complete the signature fields of a received unsigned document. In addition, although not shown in FIG. 11C, some embodiments of the present invention present a counter indicating the number of signature locations and form fields that occur in the subject document. This counter may appear at one side of the screen, for example, the right side. The counter, among other things, allows the document sender in such embodiments to include flags, or "tags" in the subject document. In embodiments such as the one shown in FIG. 11C, there may instead be provided a button or option on the screen that a signer user uses to indicate whether he or she wants (or does not want) to "place" signature locations and/or form fields on the document on the next screen, i.e., an overlay screen. If he or she chooses not to do so, the embodiment skips the overlay screen and just sends the document signature locations and form fields.

In yet other embodiments, the uploaded document is parsed and a determination made of the number of signature locations and form fields, or that the uploaded PDF had already indicated signature locations and form fields. In the latter instance, the counter at one side of the screen may be presented in accordance with the determination.

Figure 11D:
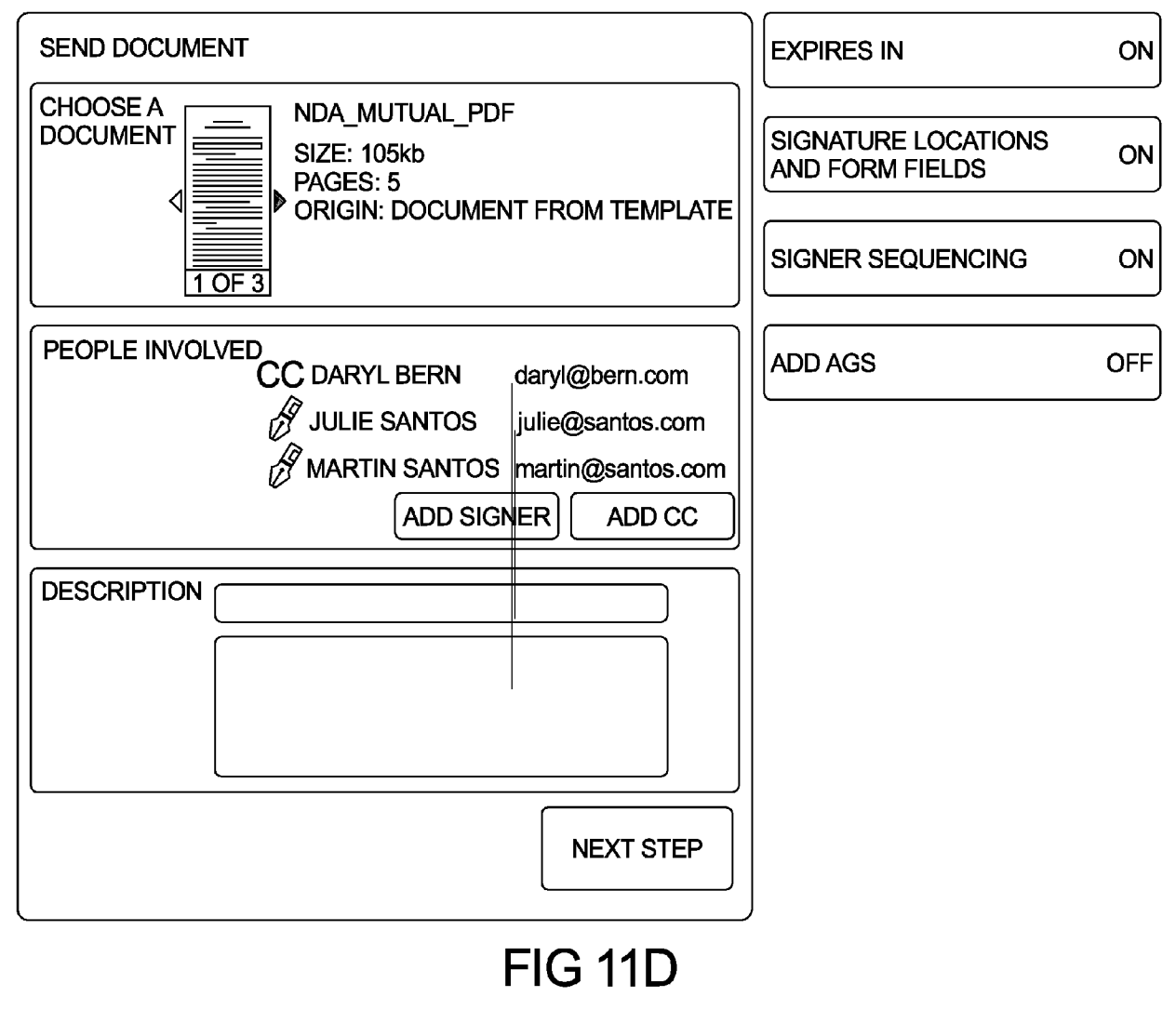
Figure 11E:
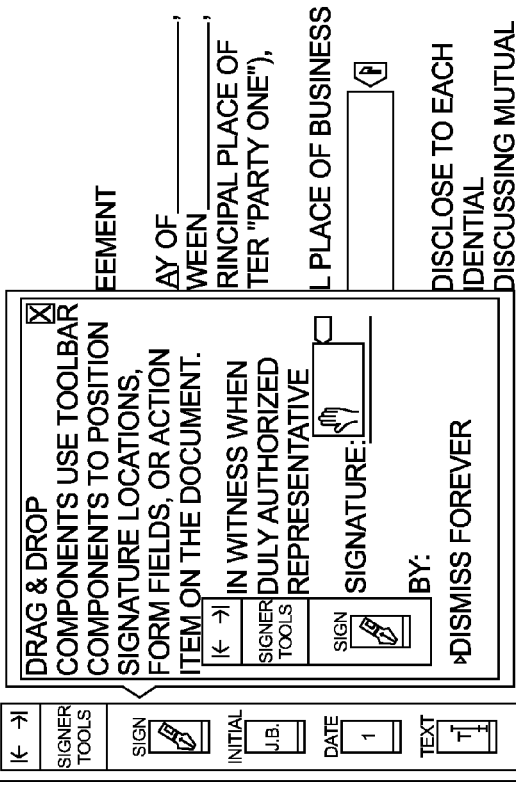
Figure 11F:
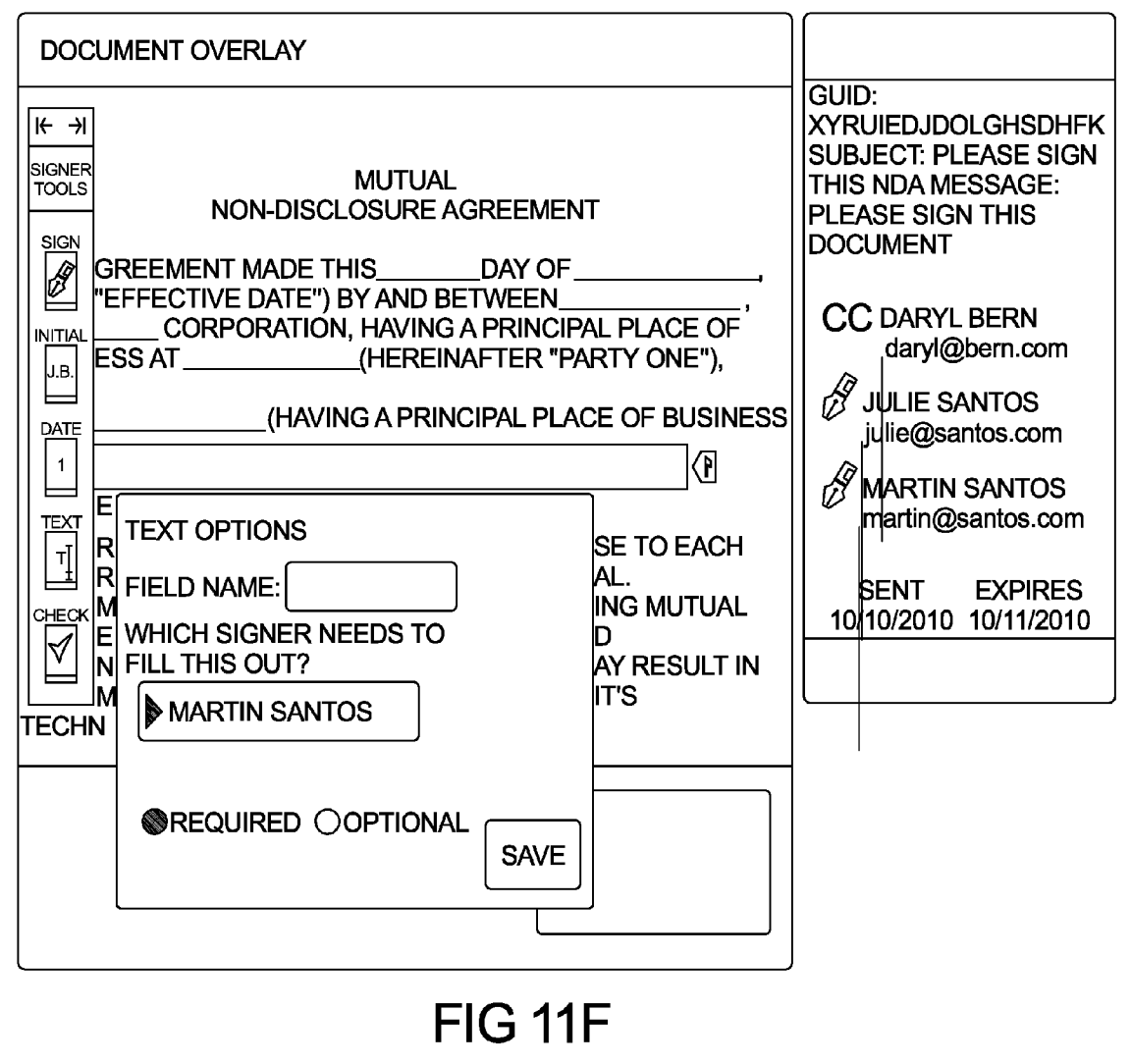
Figure 11G:
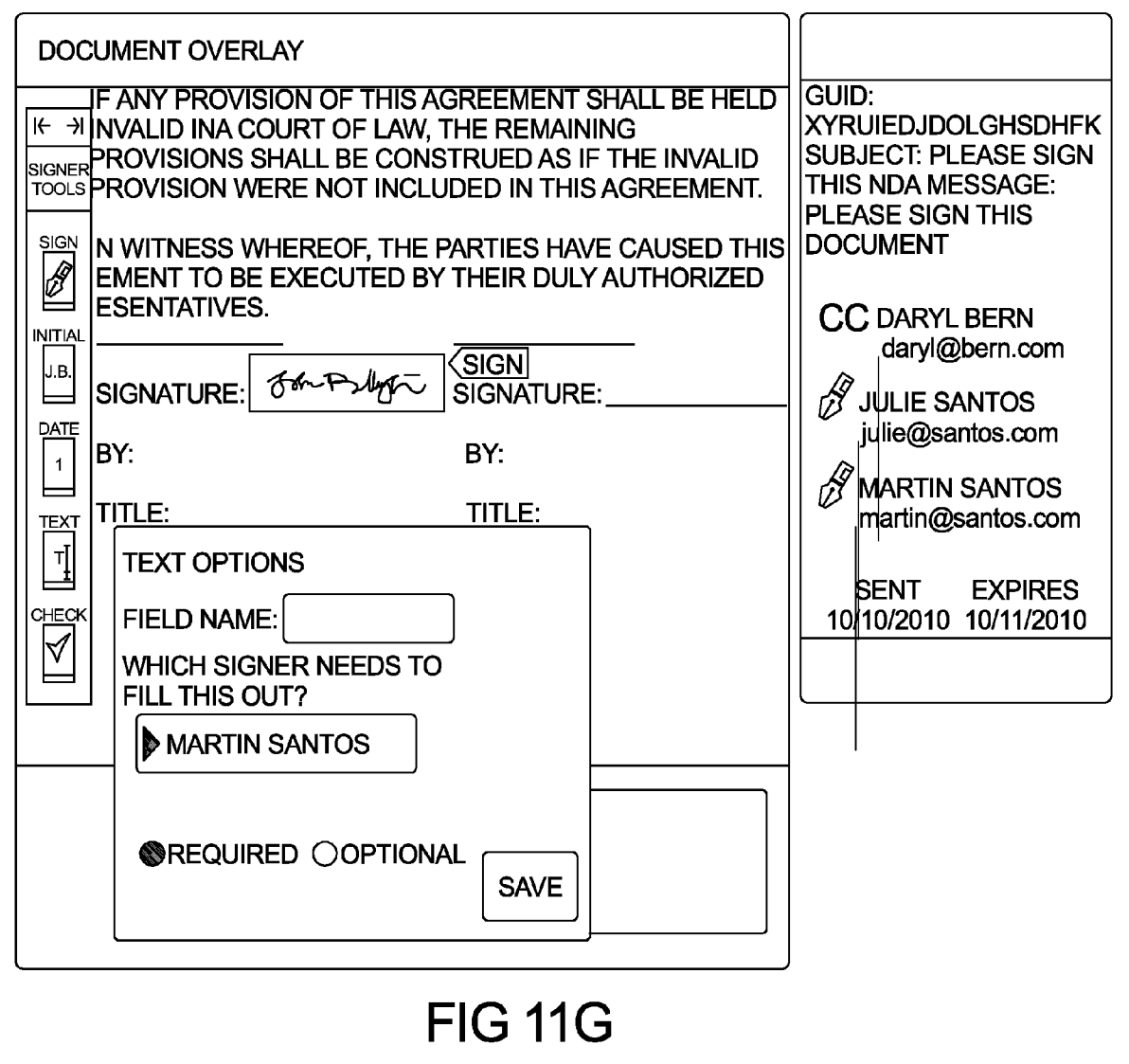

FIG. 11D shows a screen in which the document sender selected two signer users ("Martin Santos" and "Julie Santos"), and also selected a non-signer user to receive a copy of the document, including the signed document ("cc" "Daryl Bern"). FIG. 11E shows a document sender selecting a signature entry pad to insert, in the electronic document, a signature field. FIG. 11F shows the screen that allows the document sender to identify which signer user is associated with which signature field. The screen allows the document sender to indicate whether a signature is required or optional. Also, a field name is associated with a given signature field to describe the data captured in that particular field (for example, "Drivers License Number" or "Mother's Maiden Name") so that if a document sender exports the captured data into a database in the future, each piece of data has a description. FIG. 11G shows the signature entry pad associated with the signature field identified in the previous screen, located at the desired location within the document.

Figure 11H:
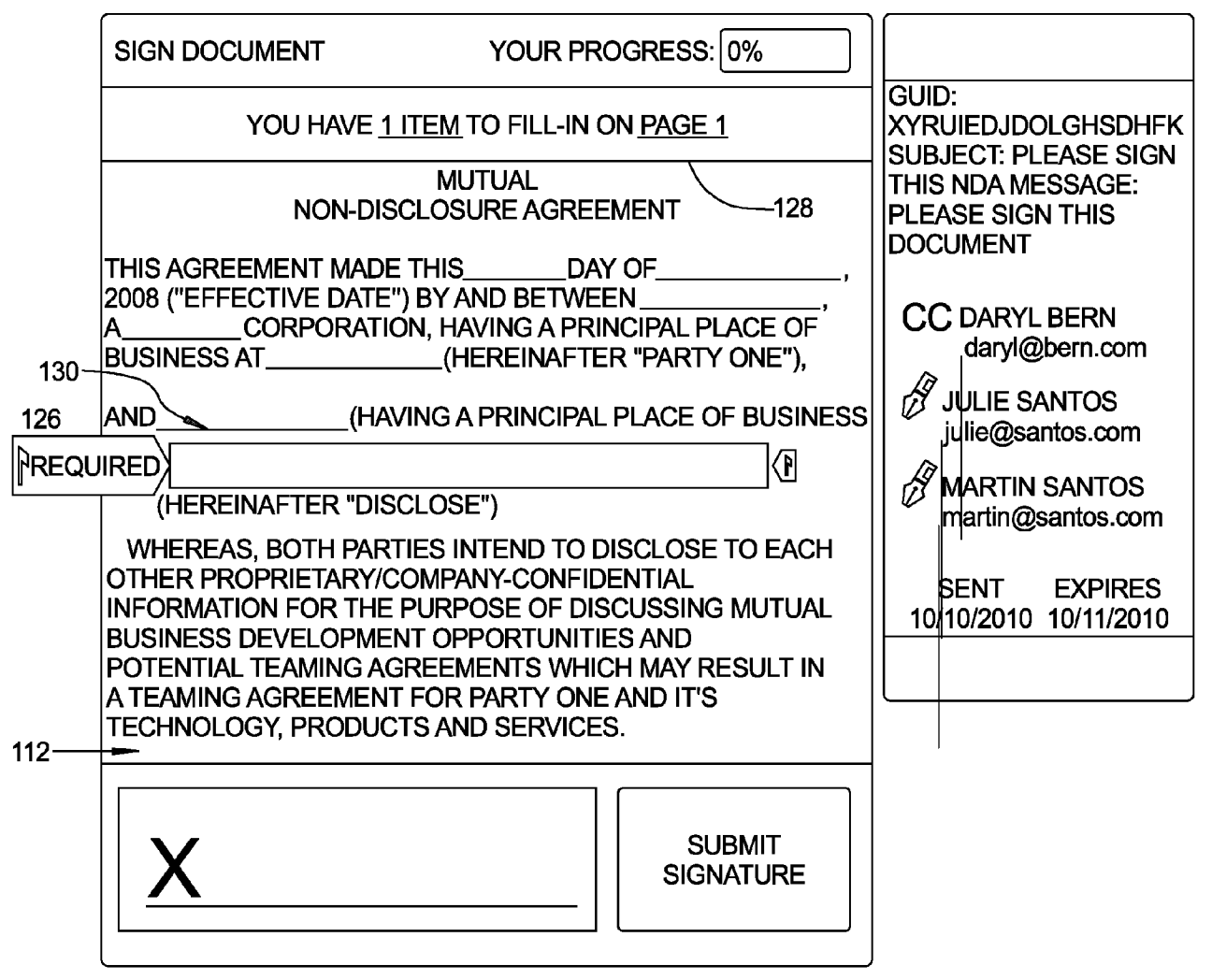

FIG. 11H shows a screen having a flag 126 to the left of a signature field 130 to be completed by a designated signer user, and summary text appearing at the top of the screen, indicating the number of signature fields to be completed in the document. At this point in the method, the screen is being displayed to a signer. The above steps are repeated iteratively until all desired signature fields and associated signature entry pads are defined and placed throughout the document.

Figure 11I:
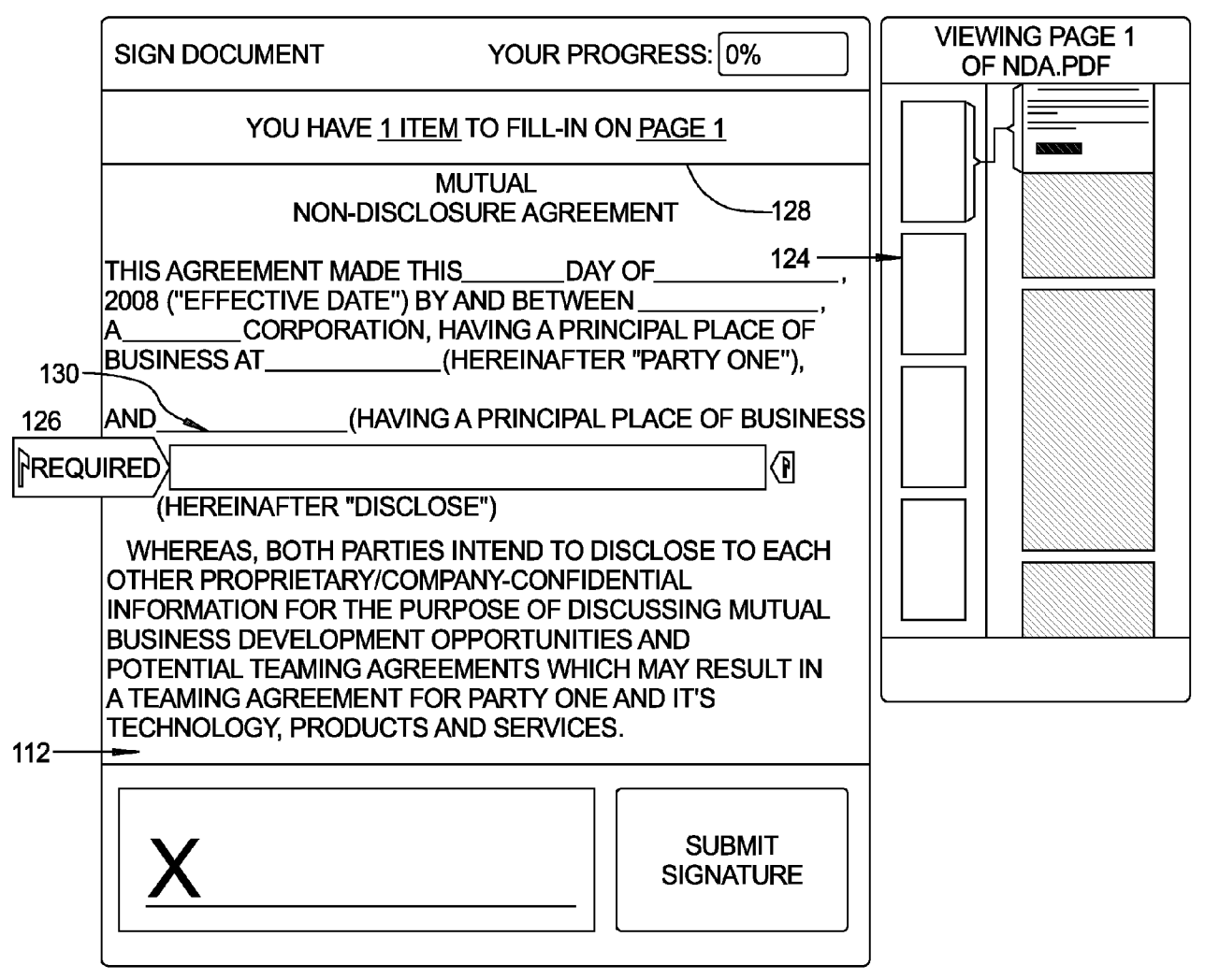
Figure 11J:

FIG. 11I shows a visual summary data indicator 124 that indicates certain information to the screen viewer about the subject unsigned electronic document 112 presented to a signer user. The visual may be in the form of a "thermometer-type" bar indicator (as shown), or any other visual quantitative indicator. The document summary server 108 collects information from each of the signer users regarding an unsigned electronic document. The collated information from the signer users is displayed on the information summary indicator 124 to indicate the level of completion of the signature fields within the target document. Note that at the top of the screen display for the document, are text instructions 128. These text instructions may function as an information summary indicator 124, as shown in FIG. 11I, or may be text instructions on what actions are required by the signer user, as shown in FIG. 11J. In some embodiments of the present invention, the information summary indicator 124 shows only the level of completion for the one signer viewing the screen, rather than the aggregated level of completion by all of the signers. In another embodiment, the aggregated level of completion is shown. In yet other embodiments, both the level of completion for one or more signers may be shown, along with an aggregated level of completion.

FIG. 11J shows how the signature field and associated signature entry pad 132 appears to the signer user once the scaffold document is completed and sent to the signer user. Note that the information summary indicator 124 changes to reflect that there remains one incomplete signature field in the document. In a color version of this embodiment, pages having incomplete signature fields may appear in one color, such as red, whereas pages on which all signature fields are complete may appear in another color, such as blue. The information summary indicator 124 may include both a dynamic element, as in the illustrated embodiment, wherein an indicator "slides" from the top to the bottom of a bar to indicate level of completion, and/or a color element.

Figure 11K:
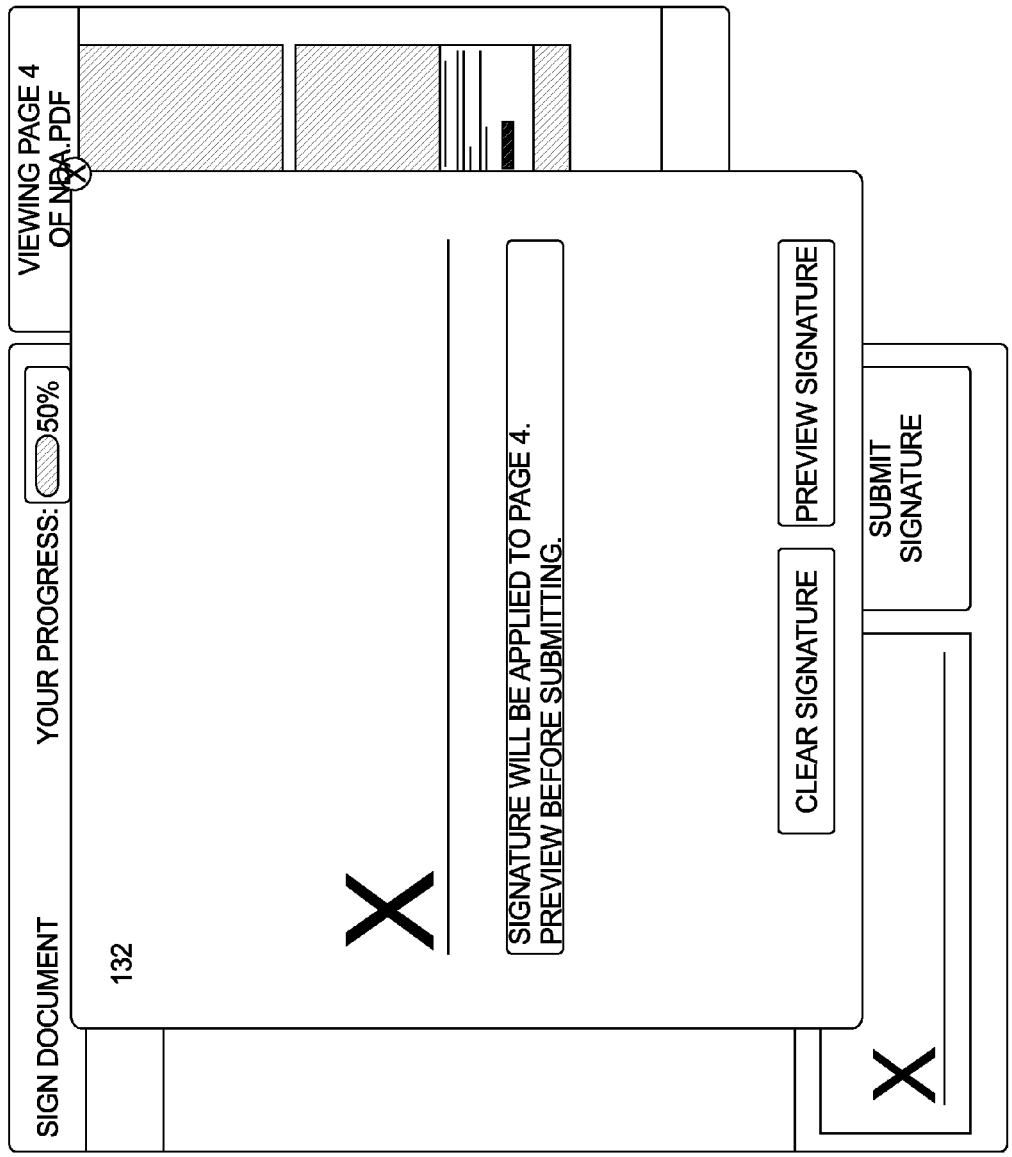
Figure 11L:
Figure 11M:
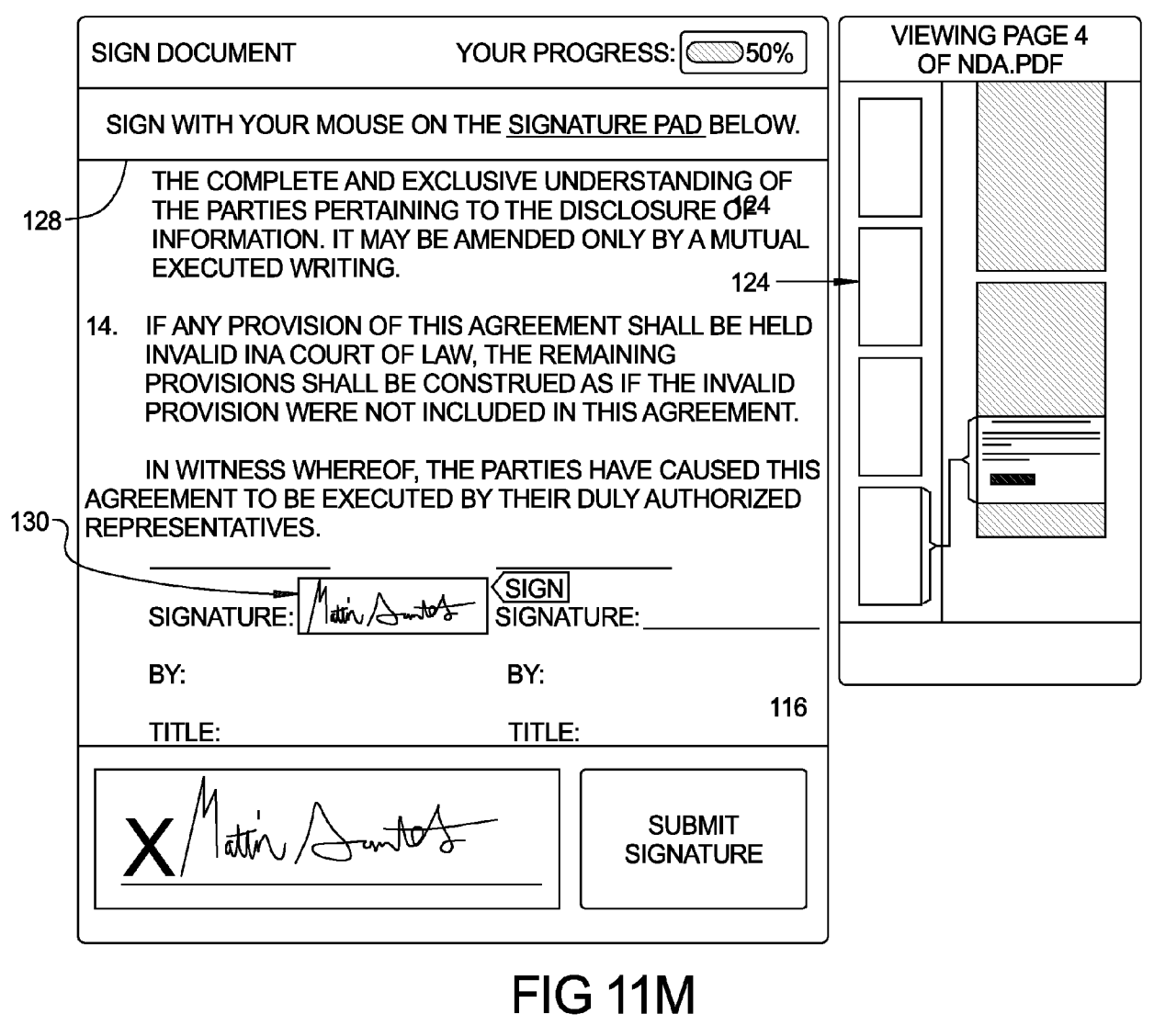

FIG. 11K is a close-up view of the signature field and associated signature entry pad 132, as shown in FIG. 11J. FIG. 11L shows the same signature field with a freehand signature included from a signer user. FIG. 11M shows a document with a signature in the signature field, prior to the signed document being submitted to the document execution server.

Although these screen shots show one implementation of the present method and system, there are many variations on the specific systems used, software programs and languages used, and layout and design used in implementing the present method and system within the scope of the claims.

The present methods and system can be practiced in a number of variations, including variations on workflow. In an embodiment, some information entry fields 122 are identified as being required to be completed, whereas other fields 122 are optional. In an embodiment, the workflow order is adjusted in accordance with the type of document to be completed, the number and nature of the signer users 120 involved, and other variations based on the preferences set by the document sender 110. In one such embodiment, the document sender 110 is a set workflow order requiring one signer user 120 to complete one or more information entry fields 122 before certain other identified signer users. The document summary server 108 may include workflow order restrictions for an unsigned electronic document 112 requiring iterative, serial actions. For example, a document sender 110 may instruct that signer user 1 $U_1$ complete information entry field 1 $F_{1,1}$, followed by the completion by signer user 2 $U_2$ of information entry field 2 $F_{2,1}$, before signer user 1 $U_i$ completes information entry field 2 $F_{1,2}$, and so forth until all information entry fields are complete.

In a more simplified embodiment, the document summary server assigns a workflow order that requires a first signer user $U_1$ complete all information entry fields F prior to the document being sent to another signer user $U_i$. In another embodiment, the document summary server 108 requires that each signer user complete the information entry fields in a predetermined order; for example, for signer user 1, $U_1$, $F_{1,1}$, THEN $F_{1,2}$, and the like.

At least one embodiment includes various forms of exclusivity. For example, information entry fields may be shared by one or more signer user, such that either signer user may complete one or more designated information entry fields. This may be done on a per-field basis, or for all fields in an entire document. In another embodiment, information entry fields are shared by one or more signer users, such that each signer user individually completes a designated information entry field, and the information provided by each such signer user is concatenated to complete a single information entry field.

At least one embodiment of the present apparatus and method includes variations on graphical updating of the summary data, represented by an information summary indicator 124. Also, in at least one embodiment, upon receipt of the $F_{i,j}$ data, the graphical representation of the information summary indicator 124 is updated immediately to the user $U_1$. Furthermore, in at least one embodiment, upon receipt of the $F_{i,j}$ data, the graphical representation of the information summary indicator 124 is NOT updated immediately to the user $U_1$. In at least one embodiment, upon receipt of the $F_{i,j}$ data, the graphical representation of the information summary indicator 124 is updated immediately for future users, i.e., $U_{i+1}$.

In at least one embodiment of the present system and method, one or more $F_{i,j}$ have default values that cannot be modified by a sender user. For example, "Date" information entry fields automatically fill with the current date. In at least one embodiment, at least one of the information entry fields have default values that can be modified by all or certain identified signer users. In at least one embodiment, some information entry fields may be filled using a merge function, and are thus denominated as "merge fields." These embodiments have merge fields that are filled in by the document sender before sending rather than the signer user. The data in the merge fields in these embodiments is merged into the document before the signer user sees it, and thus may be viewed as the sender "pre-filling" these fields before sending the document. In at least one embodiment, some multiple $F_{i,j}$ are completed by information input only one time by the signer user; for example, a single signature event then is automatically input simultaneously into potentially many $F_{i,j}$ identified either by a signer user, or the document sender.

Further, at least one embodiment includes displaying to each signer user 120 different types and amounts of information relating to a scaffold document 118. For example, the screen display of an unsigned electronic document 112 includes the total number information entry fields |F| and the number of complete information entry fields |C|, but not the total number of incomplete information entry fields for a specified document. In at least one embodiment, the screen display of an unsigned electronic document 112 includes the total number information entry fields $|F_{i,j}|$ and the number of incomplete information entry fields |I|, but not the total number of complete information entry fields |C| for a specified document.

In at least one embodiment, the screen displays the page numbers $P_{i,j}$ on which the next incomplete information entry field $I_{i,j}$ appears.

In at least one embodiment, the display for a display screen on which the scaffold document 118 or the unsigned electronic document 112 appear includes a conventional moveable window that is slidable over the display of the unsigned electronic document to make available for viewing only that portion of the document underlying the region of the window. At least one embodiment includes an actionable link $L_{i,j}$ that is displayed to bring the next information entry field to the viewport. In at least one embodiment, an actionable link $L_{i,j}$ is displayed for the incomplete required information entry fields $I_{i,j}$. In at least one embodiment, a visual indicator of the next incomplete required information entry fields $Z_{i,j}$ is displayed for incomplete required information entry fields $I_{i,j}$. In at least one embodiment, the visual indicator of the next incomplete required information entry field $Z_{i,j}$ is displayed for $I_{i,j}$, and includes an actionable link to bring the target information entry field into the viewport; for example, the visual indicator is an arrow on one side of the display screen, which arrow is clickable.

In addition, at least one embodiment includes various ways of displaying to one or more signer user what information is entered by one or more of the other signer users. For example, the information summary indicator may display to one signer user which information entry fields are completed by the other signer user, and which remain incomplete. In this embodiment, for example, the completed information entry field by one user $C_{i,j}$ appears as a green box on the unsigned electronic document displayed to a second signer user, whereas an incomplete information entry field by one user $I_{i,j}$ is displayed as a red box on the unsigned electronic document displayed to the second user.

The various methods described above may be embodied in, and fully automated by, software code modules (in some cases, for example, front end browser code running in a browser) executed by one or more general purpose computers, tablet computers, and/or special purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data. The flow of data through a network as well as the division and separation of data, controlled access to the data by the various parties involved, and verification of data over a distributed and/or public or private network are considered distinguishing features of the present invention. However, these features are not necessarily present in whole or in part in every embodiment, nor are they considered the only distinguishing features.

For example, in at least one embodiment and referring to FIG. 12, a signature field 130 with a "zoom on entry feature" is provided, wherein a signature field 130 along with a displayed portion 502 of an unsigned electronic document 112 (or a partially signed electronic document 116) is magnified. This magnification occurs when signature field 130 is selected for entry of any data by a signer user 120 when the unmagnified signature field 130 is deemed or otherwise determined to be too small for the signer user 120 to comfortably see or enter data therein. In some embodiments of the present invention, magnification occurs every time a user selects a field. Magnification occurs when the unmagnified signature field 130 into which data is to be entered is clicked on by the signer user 120 using a mouse cursor 504 over the unmagnified signature field 130, by signer user 120 tapping a touchpad, touching a touchscreen, and/or tapping a pen or stylus on a drawing tablet. In some embodiments, magnification occurs when a user simply hovers a mouse or other pointing device having a representation on the screen over a field, whether or not the field is clicked. Embodiments of the present invention may include one or more "zoom on entry" activation methods as may be appropriate for the user device or devices being used to display documents 112 (or 116). The zoom on entry feature is provided in some embodiments by front-end code sent to the user's browser via the document execution server 102. In some of these embodiments, the size of the user's browser window is used to determine the amount of magnification provided and/or the size of the entry field provided to the user. Thus, the zoom amount in some embodiments need not be fixed magnification, and the browser software and associated processor performs the mathematics needed to perform the zoom feature. One non-exclusive example of a front-end language suitable for use in writing such applications for browsers is JAVASCRIPT®, a product available from Oracle America, Inc. Corporation Delaware 500 Oracle Parkway Redwood Shores Calif. 94065.

When the "zoom on entry" feature is activated, the display of document 112 (or 116), including the signature field 130, is "zoomed" to a comfortable magnification for entry of the data into the signature field 130. For example, in an embodiment in which typed text is to be entered into a signature field 130, the document 112 (or 116) and the signature field 130 are zoomed so that typed data appears at least at a point size deemed viewable in the smallest size display screen 506 that a signer user 120 is anticipated to use. The point size can be parameterized. For example, in some embodiments, information about the actual size of display screen 506 (or information from which the actual screen size may be determined) is sent to the document execution server 108 before the document 112 (or 116) is sent to the user. In this manner, for example, a document 112 (or 116) suitable for displaying and signing on a so-called "smart phone" may be zoomed to a different factor than one appearing on a moderate size tablet computer or a full-screen laptop or desktop computer. This information can frequently be determined, or at least intelligently estimated, by a browser and/or operating system identification string sent to the document server upon the initial request for the document. In many instances, parameterization of the smallest point size will allow a smart phone application to enlarge the input field, but prevent a full-size laptop or desktop display from being enlarged uncomfortably and/or unnecessarily.

In some embodiments, the smallest point size is set globally by the service provider (e.g., the provider of the document execution server 102). In other embodiments, the smallest point size is set per document 112 or per document type (e.g., in the document "library" shown in FIG. 11A) or even per signer user 120 or per signature field 130 by the composer of the scaffold electronic document 118. In still other embodiments, a global setting by the service provider is used unless overridden by the composer of the scaffold electronic document 118. In yet other embodiments, some or all smallest point sizes are set by default but are overridden by more specific document, user or signature field settings.

Figure 13:
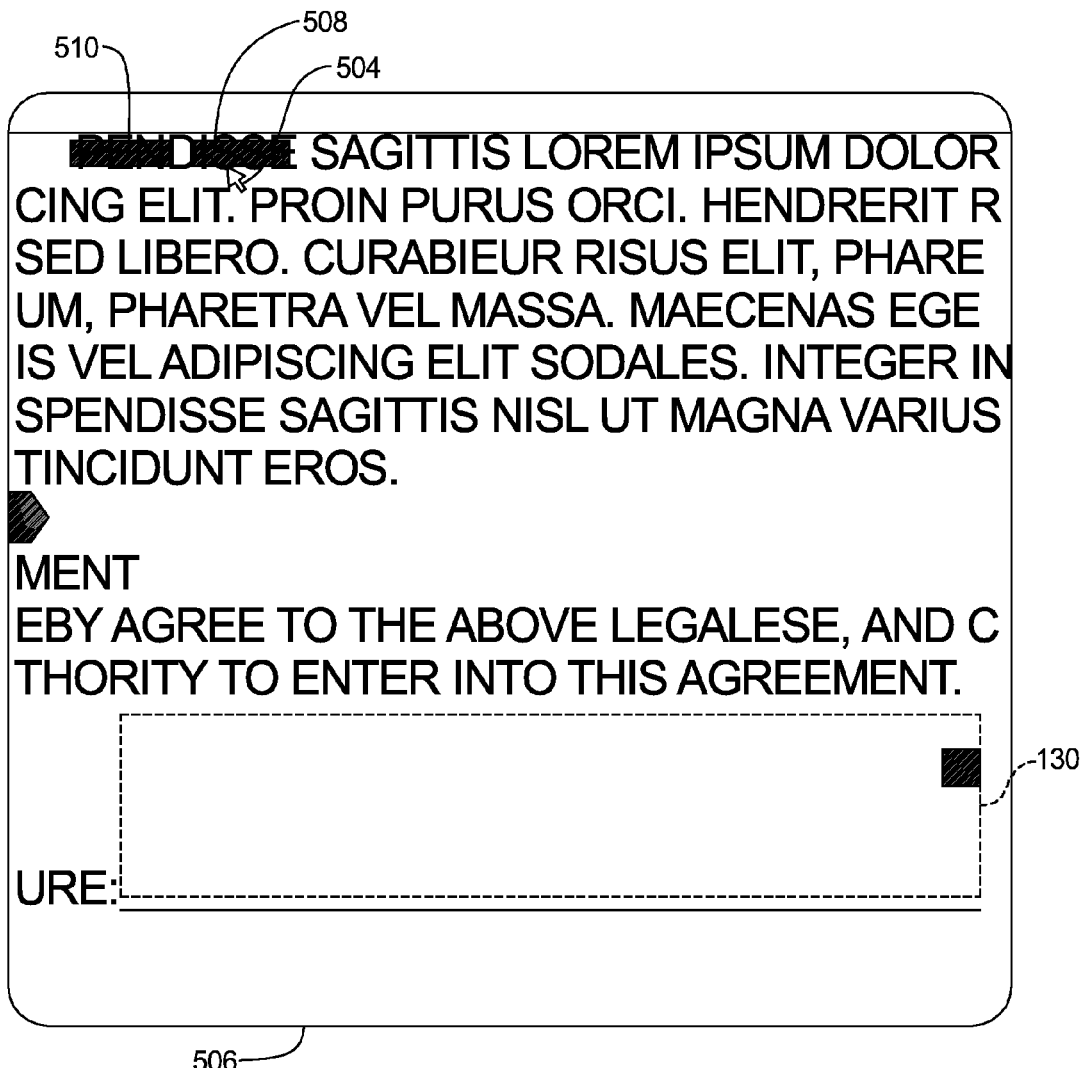
FIG. 13 is a screenshot of the display of FIG. 12 in which the "zoom on entry" feature has been activated.

In some embodiments of the present invention, to return to the pre-zoomed magnification and referring to FIG. 13, a virtual button 508 (i.e., a GUI button or other type of active region) is provided. This virtual button 508 helps ensure that accidental mouse clicks, finger touches, etc. do not cause the display of electronic document 112 (or 116) to revert back to an unviewable text size and/or terminate input prematurely. A virtual button 508 for returning to the pre-zoomed magnification is particularly useful because it allows a signer user 120 to return to his or her own selected magnification. Pressing on the virtual button 508 permits further reading or scanning of the document 112 (or 116) without having to scroll or otherwise press several buttons to return to the same pre data entry magnification preferred by the signer user for that purpose. In the embodiment represented by FIG. 13, virtual button 508 is a button labeled "signed!" to prompt the signer user 120 to click on the button when he or she is finished entering data into the signature field 130. However, the use of different labels is contemplated, when appropriate, for other signature fields 130. In the embodiment represented by FIG. 13, for example, a second virtual button 510 labeled "zoom out" is provided on the display screen GUI. This "zoom out" button can be used as an escape in the event the signer user 120 does not intend or decides not to sign a particular signature field 130, perhaps because he or she activated the zoom on entry feature by accident. In some embodiments in which zoom occurs simply by hovering a pointer over a field, the field is returned to its pre-zoomed magnification when the pointer is moved and no longer hovering over the field. In other embodiments, the field is returned to its pre-zoomed magnification occurs clicking or touching anywhere outside of the pre-zoomed magnification field. In some embodiments, the field is returned to its pre-zoomed magnification when, for example, the browser front end code (supplied by the document execution server) running on the user's browser apparatus determines that the field has been completed (e.g., the tenth digit is entered in a phone number field, or a signature was drawn in a signature box).

The use of a virtual button 508 in some embodiments of the present invention facilitates non-text entry, such as freehand drawings or hand-written signatures, into a signature field 130, but is not required in all embodiments of the present invention. For example, one might expect that pressing or taping a pen or stylus (or even a finger on a touchscreen) outside of a signature field 130 would have the effect of zooming or moving the document 112 (or 116). However, in one embodiment that requires that the virtual button 508 be pressed instead, a signature or other drawing will not be prematurely terminated if the signature or drawing inadvertently extends beyond the boundary of the signature field 130 while it is being entered.

In some embodiments of the present invention, a mouse click or the push of a physical button of a touchpad, a drawing pad, or a stylus or a pen used with a drawing pad is programmed to perform the same function as the pressing of the virtual button 508.

Figure 14:
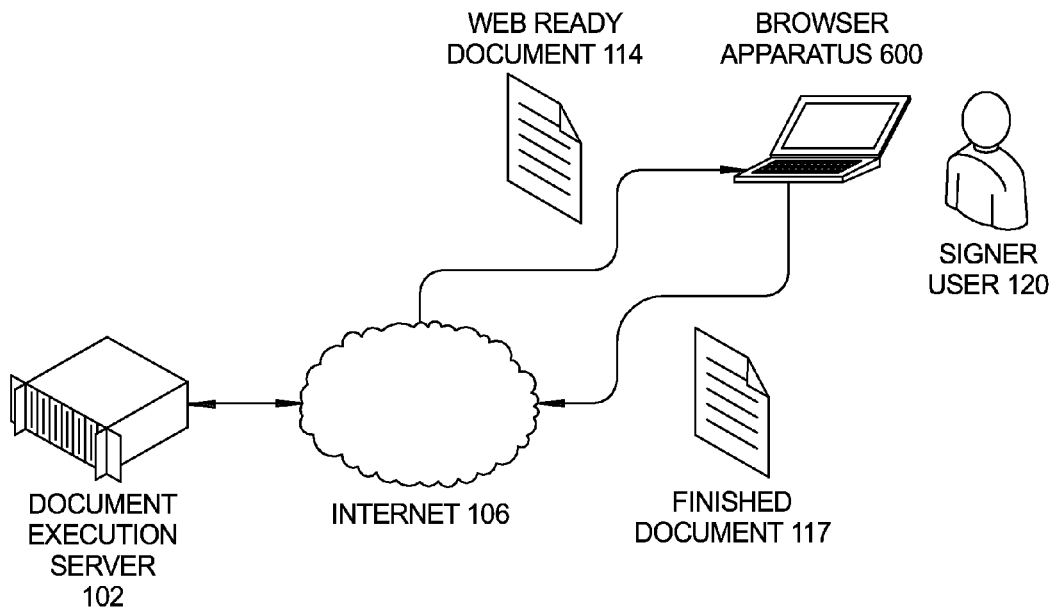
FIG. 14 is a schematic diagram showing a signer user provided with a browser apparatus coupled to a document execution server via a network such as the Internet.

For example, and referring to FIG. 14, in one embodiment of the present inventive method, a signer user 120 is provided with a browser apparatus 600 communicatively coupled to a document execution server 102 via a network such as the Internet 106. The coupling may utilize any known coupling means such as Ethernet, fiber, or radio. Non-exclusive examples of browser apparatus 600 include a laptop computer, a desktop computer, a tablet computer, or a smartphone including a display screen 602, a pointing apparatus 604 capable of manipulating a virtual button on display screen 602 such as a mouse trackball, or stylus and stylus pad, or a touch-sensitive portion of display screen 602 (which may be the entire display screen). Browser apparatus 600 also includes a data entry apparatus 606, which may be integral to the display screen, such as the touch-sensitive display screen 602 itself, a virtual keyboard or writing area of display screen 602, a separate device, such as a computer keyboard, or a device that comprises the stylus and stylus pad, and a processor 608 with or in communication with non-transient memory 610 that is configured to execute a browsing program.

It will be appreciated that configurations of the "zoom on entry" feature can be used for any of various types of electronic documents having entry fields.

It is also to be observed that the "zoom on entry" feature can be embodied as a software and/or hardware module either in the document execution server 102 or in a document 112 (or 116) sent or emailed to a signer user 120. For example and referring back to FIG. 13, in at least one embodiment, HTML code embedded within the document 112 (or 116) is provided that sends information regarding the portion of document 112 (or 116) being displayed, along with information regarding mouse clicks, screen touches, and/or pen or stylus touches or clicks to the document execution server 102. The document execution server 102 is responsive to such information to send a new view of the document 112 (or 116) to the computer or other display device used by the signer user. This new view is one that zooms into the signature field 130 if information regarding the currently displayed document indicates that the display of the signature field 130 and the displayed document portion 502 around it should be zoomed. Prior to zooming in, a cookie is set in at least one embodiment to preserve information about the pre-zoomed state of the document 112 (or 116). The display code sent to the signer user includes a graphical user interface (GUI) button 508 that is responsive to user input (e.g., a mouse click, a screen touch, or a pen or stylus click on a tablet computer) to restore the screen zoom prior to the occurrence of the zoom based upon the value of the cookie. In at least one embodiment, the information in the cookie is sent directly to the document execution server 102 and the information saved by the cookie is used directly by the document server to restore the pre-zoomed state. Also, in at least one embodiment, the information in the cookie is used by the signer user's browser to restore the pre-zoomed state.

In at least one embodiment, the document 112 (or 116) received by the signer user 120 includes embedded HTML, Javascript, and/or Java code, or some other suitable front end code executable in a web browser or the display program or plug-in that is being used to display the document at the signer user's own display screen 506. The user's computer, phone, or table computer is used to execute this code locally in order to zoom in and to zoom back out.

Figure 15:
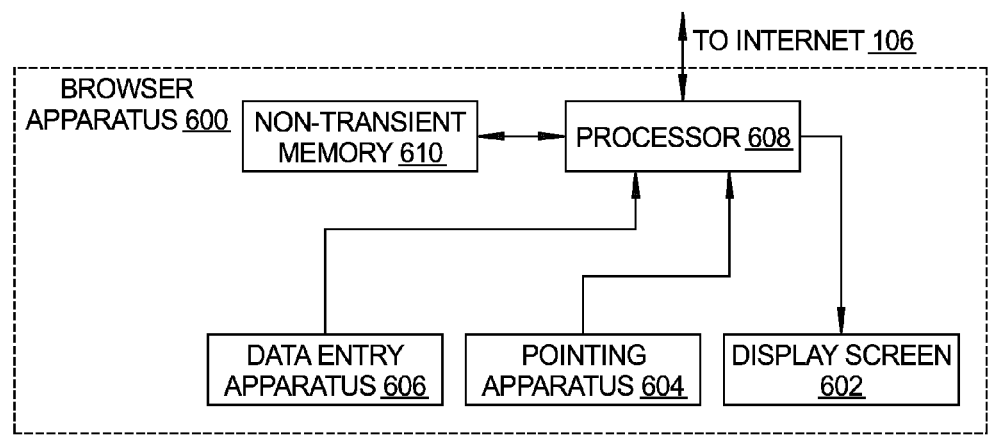
FIG. 15 is a schematic diagram showing a method provided for electronic document handling utilizing a browser apparatus communicatively coupled to a document execution server in which the browser apparatus includes a display screen, a pointing apparatus, a data entry apparatus, a processor, and non-transient memory configured to execute a browsing program on the processor.
Figure 16:
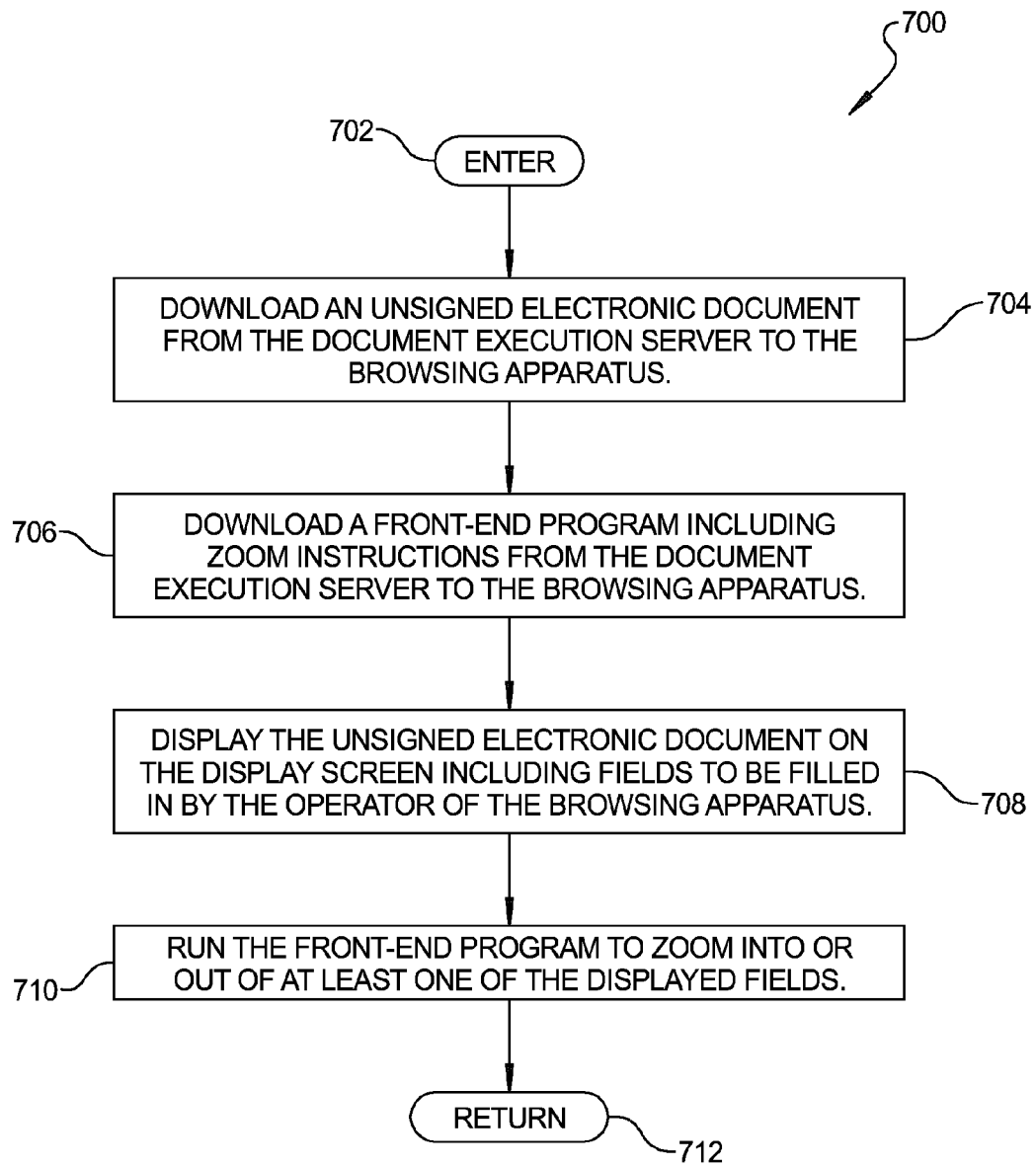
FIG. 16 is a flowchart for a method for electronic document handling utilizing a browser apparatus communicatively coupled to a document execution server in which the browser apparatus includes a display screen, a pointing apparatus, a data entry apparatus, a processor, and non-transient memory configured to execute a browsing program on the processor.

Thus, in one embodiment of the invention and referring now to FIGS. 14, 15, and 16, a method is provided for electronic document handling utilizing a browser apparatus 600 communicatively coupled to a document execution server 102, the browser apparatus 600 including a display screen 602, a pointing apparatus 604, a data entry apparatus 606, a processor 608, and non-transient memory 610 configured to execute a browsing program on processor 608. The method 700 starts at box 702 and includes, at box 704, downloading an unsigned electronic document 114 from the document execution server 102 to the browser apparatus 600 At box 706, the method further includes downloading a front-end program including zoom instructions from the document execution server 102 to the browser apparatus 600, wherein the front-end program is either separate from or part of the unsigned electronic document. The method further includes displaying, at box 708, the unsigned electronic document 114 on the display screen 602 of the browser apparatus 600 using the browsing program within the browser apparatus, wherein displaying the unsigned electronic document 114 includes displaying fields to be filled in by the operator of the browser apparatus using the pointing apparatus 604 and the data entry apparatus 606. Also included in the method, at box 710, is running the front-end program downloaded from the document execution server 102 to zoom into or out of at least one of the displayed fields.

In some embodiments of the present invention, running the front-end program to zoom into or out of at least one of the displayed fields at box 710 further comprises zooming the at least one of the displayed fields when the pointing apparatus 604 is hovered over the field. Also, in some embodiments of the present invention, running the front-end program to zoom into or out of at least one of the displayed fields at box 710 further comprises providing a button, such as virtual button 508, on the display screen 602 and zooming out of zoomed displayed field when the button is pressed.

In some embodiments of the present invention, zooming out of a zoomed displayed field at box 710 comprises zooming out to an original magnification, i.e., using the magnification of the screen at a time immediately before a zoom occurs.

Also in some embodiments of the present invention, the displayed field is a field into which a drawing or signature is entered, and zooming out of the displayed field comprises inhibiting the zooming out of the displayed field until a virtual button is pressed to prevent premature termination of the entry of the drawing or the signature.

In yet further embodiments of the present invention, zooming into at least one of the displayed fields in box 710 comprises the browser apparatus 600 determining a size of the browsing window and zooming in by a factor dependent upon the size of the browsing window. Also in some embodiments, zooming into at least one of the displayed fields comprises zooming in by at least one factor dependent upon either or both of a predetermined fixed width supplied by the front-end code and a size of the displayed field to be filled in.

Some embodiments of the present invention comprise a browser apparatus 600 that is configured to perform the inventive steps of the preceding methods. It will be understood that the configuration of browser apparatus 600 to perform such steps may comprise selecting a processor 608 and a program to run in non-transient memory 610 that instructs browser apparatus 600 to perform the necessary steps using processor 608 to run the program. In some embodiments, a program running in browser apparatus 600 includes a front-end program downloaded from document execution server 102, and these embodiments may exist only after the front-end program is downloaded.

While the invention has been described in terms of various specific embodiments, those skilled in the art will recognize that the invention can be practiced with various modifications within the spirit and scope of the invention. Also, embodiments which do not provide all of the benefits and features set forth herein are also considered within the scope of this invention, even though they include only some but not necessarily all of the features and methods described herein and are not specifically described herein. More particularly, various combinations of features described herein are all contemplated as being possible unless otherwise explicitly excluded or the features are physically impossible to combine. Upon gaining an understanding of the present invention by reference to this disclosure, one of ordinary skill in the art could select subsets and supersets of features disclosed herein to make additional embodiments that would thus be considered to be embodiments within the scope of the present invention.

What is claimed is:

1. A method for electronic document handling utilizing a browser apparatus communicatively coupled to a document execution server, the browser apparatus including a display screen, a pointing apparatus, a data entry apparatus, and a processor with non-transient memory configured to execute a browsing program on the processor;

the method comprising:
   downloading an unsigned electronic document from the document execution server to the browser apparatus;
   downloading a front-end program including zoom instructions from the document execution server to the browser apparatus, wherein the front-end program is either separate from or part of the unsigned electronic document;
   displaying the unsigned electronic document on the display screen of the browser apparatus using the browsing program within the browser apparatus, wherein displaying the unsigned electronic document includes displaying a first virtual button, a second virtual button, and fields to be filled in by an operator of the browser apparatus using the pointing apparatus and the data entry apparatus; and
   running the front-end program downloaded from the document execution server to zoom into or out of at least one of the displayed fields,
   wherein said displayed field is a field into which a drawing or a signature is entered, wherein zooming into said displayed field is performed by the front-end program in response to the operator of the browser apparatus selecting said displayed field, and wherein zooming out of said displayed field is performed by the front-end program in response to the operator of the browser apparatus pressing one of the first virtual button and the second virtual button, the first virtual button operating to zoom out, to prevent premature termination of the entry of the drawing or the signature, to register completion of the entry into the displayed field upon being pressed, and to direct updating of a steps-to-go indicator that indicates a number of fields still to be completed, the second virtual button operating to zoom out and to cancel entry of a drawing or the signature into the displayed field upon being pressed, such that said drawing or signature is not entered.

2. A method in accordance with claim 1 wherein said running the front-end program to zoom into or out of at least one of the displayed fields further comprises zooming said at least one of the displayed fields when the pointing apparatus is hovered over the field.

3. A method in accordance with claim 1 wherein said zooming out of a zoomed displayed field comprises zooming out to an original magnification.

4. A method in accordance with claim 1 wherein said zooming into at least one of the displayed fields comprises the browser apparatus determining a size of the browsing window and zooming in by a factor dependent upon the size of the browsing window.

5. A method in accordance with claim 1 wherein said zooming into at least one of the displayed fields comprises zooming in by at least one factor dependent upon a member of the group consisting of a predetermined fixed width supplied by the front-end code and a size of the displayed field to be filled in.

6. A method in accordance with claim 5 wherein the factor is dependent upon the predetermined fixed width supplied by the front-end code.

7. A method in accordance with claim 5 wherein the factor is dependent upon the size of the displayed field.

8. A method in accordance with claim 1,
   wherein displaying the unsigned electronic document effects display of the unsigned electronic document at a user-selected magnification level set by the operator of the browser apparatus,
   wherein running the front-end program downloaded from the document execution server to zoom into a first displayed field establishes a predetermined magnification level independent of the user-selected magnification level, such that the same predetermined magnification level is applied regardless of the user-selected magnification level, and
   wherein zooming out of the first zoomed display field reestablishes the user-selected magnification level.

9. A method in accordance with claim 8, further comprising:
   setting a cookie in the browser apparatus to indicate the user-selected magnification level;
   downloading a second view of the unsigned electronic document from the document execution server to the browser apparatus;
   displaying the second view of the unsigned electronic document with a magnification level different from the user-selected magnification level; and
   upon receipt of a user input, reading the cookie and displaying the second view of the unsigned electronic document with the user-selected magnification level, thereby restoring the user-selected magnification level.

10. A browser apparatus for electronic document handling, said browser apparatus configured to be communicatively coupled to a document execution server, the browser apparatus comprising a display screen, a pointing apparatus, a data entry apparatus, and a processor with non-transient memory configured to execute a browsing program on the processor;
   the browser apparatus configured to:
      download an unsigned electronic document from the document execution server to the browser apparatus;
      download a front-end program including zoom instructions from the document execution server to the browser apparatus, wherein the front-end program is either separate from or part of the unsigned electronic document;
      display the unsigned electronic document on the display screen of the browser apparatus using the browsing program within the browser apparatus, wherein to display the unsigned electronic document, the browser apparatus is configured to display a first virtual button, a second virtual button, and fields to be filled in by an operator of the browser apparatus using the pointing apparatus and the data entry apparatus; and to run the front-end program downloaded from the document execution server to zoom into or out of at least one of the displayed fields, wherein the displayed field is a field into which a drawing or a signature is to be entered, wherein the front-end program is configured to zoom into said displayed field in response to the operator of the browser apparatus selecting said displayed field, and wherein the front-end program is configured to zoom out of said displayed field in response to the operator of the browser apparatus pressing one of the first virtual button and the second virtual button, the first virtual button operating to zoom out, to prevent premature termination of the entry of the drawing or the signature, to register completion of the entry into the displayed field upon being pressed, and to direct updating of a steps-to-go indicator that indicates a number of fields still to be completed, the second virtual button operating to zoom out and to cancel entry of a drawing or the signature into the displayed field upon being pressed, such that said drawing or signature is not entered.

11. A browser apparatus in accordance with claim 10 wherein to run the front-end program to zoom into or out of at least one of the displayed fields, said browser apparatus is further configured to zoom said at least one of the displayed fields when the pointing apparatus is hovered over the field.

12. A browser apparatus in accordance with claim 10 wherein to zoom out of a zoomed displayed field, said browser apparatus is configured to zoom out to an original magnification.

13. A browser apparatus in accordance with claim 10 wherein to zoom into at least one of the displayed fields, the browser apparatus is configured to determine a size of the browsing window and to zoom in by a factor dependent upon the size of the browsing window.

14. A browser apparatus in accordance with claim 10 wherein to zoom into at least one of the displayed fields, said browser apparatus is configured to zoom in by at least one factor dependent upon a member of the group consisting of a predetermined fixed width supplied by the front-end code and a size of the displayed field to be filled in.

15. A browser apparatus in accordance with claim 14 wherein the factor is dependent upon the predetermined fixed width supplied by the front-end code.

16. A browser apparatus in accordance with claim 14 wherein the factor is dependent upon the size of the displayed field.

17. A computer program product including a set of non-transitory, computer-readable media having instructions which, when executed by an apparatus, cause the apparatus to perform a method for electronic document handling, the method comprising:

downloading, from a server, an unsigned electronic document and front-end code;

displaying, on a display screen of the apparatus, the unsigned electronic document, including fields of the unsigned electronic document to be filled in by an operator; and running the front-end code (i) to zoom into a displayed field in response to the operator selecting the displayed field, (ii) to display a first virtual button and a second virtual button along with the zoomed-in display field, and (iii) to zoom out of the displayed field in response to the operator pressing one of the first virtual button and the second virtual button, wherein, in response to the operator pressing the first virtual button, the front-end code operates (i) to zoom out of the displayed field, (ii) to register completion of an entry into the displayed field, and (iii) to direct updating of a steps-to-go indicator, the steps-to-go indicator indicating a number of fields of the unsigned electronic document still to be completed, and wherein, in response to the operator pressing the second virtual button, the front-end code operates (i) to zoom out of the displayed field and (ii) to cancel data entry into the displayed field, without directing updating of the steps-to-go indicator.

18. A computer program product as recited in claim 17, wherein downloading the unsigned electronic document and the front-end code includes downloading a webpage that includes the unsigned electronic document and the front-end code.

* * * * *